US008103003B2

(12) United States Patent
Hiroki

(10) Patent No.: US 8,103,003 B2
(45) Date of Patent: Jan. 24, 2012

(54) METHOD FOR SETTING COMMUNICATION PARAMETERS AND COMMUNICATION DEVICE

(75) Inventor: Shigeru Hiroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1382 days.

(21) Appl. No.: 11/441,901

(22) Filed: May 26, 2006

(65) Prior Publication Data

US 2006/0282541 A1 Dec. 14, 2006

(30) Foreign Application Priority Data

Jun. 13, 2005 (JP) ................................. 2005-172967

(51) Int. Cl.
*H04K 1/00* (2006.01)
*H04L 9/00* (2006.01)
*G06F 7/04* (2006.01)

(52) U.S. Cl. ..................... 380/270; 726/1; 726/2; 726/3; 726/4; 726/27; 726/28; 726/29; 726/30; 713/1; 713/100; 713/300; 713/320; 713/500; 713/600; 713/601; 709/220; 709/225; 709/228; 380/277; 370/252; 455/411; 705/67

(58) Field of Classification Search .................. 380/277, 380/270; 726/2–3; 709/228; 370/252; 713/600
See application file for complete search history.

(56) References Cited

U.S. PATENT DOCUMENTS

| 5,784,566 | A  | * | 7/1998  | Viavant et al. ................. 709/229 |
| 6,782,260 | B2 |   | 8/2004  | Nakakita et al. |
| 7,305,511 | B2 | * | 12/2007 | Barrett et al. ................. 710/316 |
| 7,373,508 | B1 | * | 5/2008  | Meier et al. ................... 713/168 |
| 7,444,522 | B1 | * | 10/2008 | Chang et al. ................... 713/189 |
| 7,672,457 | B2 | * | 3/2010  | Nagano et al. ................. 380/270 |
| 7,716,346 | B2 | * | 5/2010  | Suzuki et al. .................. 709/228 |
| 2002/0147819 | A1 | * | 10/2002 | Miyakoshi et al. ........... 709/228 |
| 2002/0194499 | A1 | * | 12/2002 | Audebert et al. ............. 713/201 |
| 2003/0158922 | A1 | * | 8/2003  | Park ............................... 709/222 |
| 2004/0076300 | A1 |   | 4/2004  | Ishidoshiro |
| 2004/0095942 | A1 | * | 5/2004  | Lung ............................. 370/400 |
| 2004/0229606 | A1 | * | 11/2004 | Oshima et al. ............. 455/426.2 |
| 2005/0021959 | A1 | * | 1/2005  | Tsushima et al. ............. 713/170 |
| 2005/0027910 | A1 | * | 2/2005  | Barrett et al. ................... 710/62 |
| 2005/0030922 | A1 | * | 2/2005  | Lee et al. ...................... 370/331 |
| 2005/0037734 | A1 | * | 2/2005  | Tanaka et al. ................. 455/411 |
| 2005/0201557 | A1 |   | 9/2005  | Ishidoshiro |
| 2006/0083366 | A1 | * | 4/2006  | Aoyama et al. .......... 379/114.01 |
| 2006/0146769 | A1 | * | 7/2006  | Patel et al. ..................... 370/338 |

(Continued)

FOREIGN PATENT DOCUMENTS

JP 2002-159053 A 5/2002

(Continued)

*Primary Examiner* — Edan Orgad
*Assistant Examiner* — Jenise Jackson
(74) *Attorney, Agent, or Firm* — Canon USA, Inc., I.P. Division

(57) ABSTRACT

A method for setting communication parameters in a plurality of communication devices includes setting communication parameters without an authentication process being performed for a second communication device in a case where a first communication device has received a request for setting communication parameters from the second communication device within a predetermined period of time from the start of setting communication parameters. The method further includes setting communication parameters after the authentication process has been performed for the second communication device in a case where the first communication device has received a request for setting communication parameters from the second communication device after the expiration of the predetermined period of time from the start of setting communication parameters.

21 Claims, 17 Drawing Sheets

U.S. PATENT DOCUMENTS

| | | | |
|---|---|---|---|
| 2006/0230461 A1* | 10/2006 | Hauser | 726/27 |
| 2008/0031248 A1* | 2/2008 | Vilei et al. | 370/390 |
| 2008/0146196 A1* | 6/2008 | Tanaka et al. | 455/411 |
| 2010/0118853 A1* | 5/2010 | Godfrey | 370/338 |
| 2010/0169471 A1* | 7/2010 | Allan | 709/223 |
| 2011/0085534 A1* | 4/2011 | Sugaya | 370/338 |

FOREIGN PATENT DOCUMENTS

| | | |
|---|---|---|
| JP | 2002-312155 A | 10/2002 |
| JP | 2005-117247 A | 4/2005 |

* cited by examiner

FIG. 8

| TIME STAMP | BEACON INTERVAL | CAPABILITY INFORMATION | SSID | SUPPORTED RATES | FH PARAMETER SET | DS PARAMETER SET | CF PARAMETER SET | IBSS PARAMETER SET | TIM |

METHOD FOR SETTING COMMUNICATION PARAMETERS AND COMMUNICATION DEVICE

BACKGROUND OF THE INVENTION

1. Field of the Invention

The present invention relates to a method for setting communication parameters that are used for communication among a plurality of communication devices.

2. Description of the Related Art

In a case where communication is performed among wireless communication devices through a wireless local area network (LAN) based on the Institute of Electrical and Electronics Engineers (IEEE) 802.11, the following communication parameters may be required to be set in the wireless communication devices: for example, service set identifiers (SSIDs), authentication methods [None/Wireless fidelity Protected Access-PreShared Key (WPA-PSK)/WPA-Remote Authentication Dial-In User Service (RADIUS)], user identifications (IDs) and corresponding passwords, encryption methods [None/Wired Equivalent Privacy (WEP)/Temporal Key Integrity Protocol (TKIP)/Advanced Encryption Standard (AES)], encryption keys, and operation modes [Ad-hoc/Infrastructure].

When the aforementioned communication parameters are set in a wireless LAN access point (AP), a personal computer (PC) may be connected to the AP through wiring, for example, a wired LAN or a Universal Serial Bus (USB) cable, and the user interface of the PC may be used. The following two methods for setting communication parameters in an AP through a PC exist.

In a first method, a web page for setting communication parameters is provided in an AP in advance. Then, a web server (a hypertext transport protocol (HTTP) server) is activated, and a user activates a web browser on a PC and accesses the web page for setting communication parameters to set communication parameters in the AP. This method is used mainly when a PC is connected to an AP via a wired LAN.

In a second method, a user activates a wizard for setting communication parameters on a PC and inputs communication parameters. Then, the input communication parameters are sent to an AP. This method is used mainly when a PC is directly connected to an AP via, for example, a cable.

When communication parameters are set for a wireless LAN card that is inserted into a card slot of a PC or a wireless LAN unit that is built in a PC, a user activates a wizard for setting communication parameters on a PC and inputs communication parameters to be set.

When a wireless LAN card is inserted into a card slot of a device other than a PC, for example, a digital camera or a printer, or when a wireless LAN unit is built in the device, the user interface of the device may be used to input communication parameters, as in the case of a PC.

FIG. 18 shows an exemplary user interface of a digital camera for setting communication parameters. In FIG. 18, reference numbers 1801, 1802, 1803, 1804, and 1805 denote a digital camera, a liquid crystal display, a cursor key, a menu key, and a selection key, respectively. The user of the digital camera 1801 sets communication parameters for the digital camera 1801. The user may confirm the communication parameters on the liquid crystal display 1802 by using the cursor key 1803, the menu key 1804, and the selection key 1805 of the user interface.

In this case, when the user uses the aforementioned user interface to input communication parameters, it may be cumbersome for the user to set communication parameters. In particular, when the user inputs character strings such as an SSID or an encryption key, it may be difficult for the user to set communication parameters using only the cursor key 1803, the menu key 1804, and the selection key 1805.

Thus, when communication parameters are set in a device other than a PC, for example, a digital camera, in many cases, the device is connected to a PC so that the user interface of the PC is used to set the communication parameters. In this case, the device is connected to the PC through, for example, a wired LAN or a USB cable. However, this method for setting communication parameters has a disadvantage in that communication parameters may not be set without a PC.

Thus, recently, methods for setting communication parameters in which specified devices are directly connected to each other have been developed.

For example, a method for setting up a second communication unit (wireless communication) by using a first communication unit (contact-type wire communication) is disclosed in United States Patent Application No. 20020147819 (Japanese Patent Laid-Open No. 2002-359623).

Moreover, a method for sending information that is required for communication through a wireless connection path to an opposite terminal using a wire communication unit is disclosed in Japanese Patent Laid-Open No. 2002-312155. A method for performing switching between communication through a wired connection path and communication through a wireless connection path when attachment or detachment of a terminal has been detected is also disclosed in Japanese Patent Laid-Open No. 2002-312155.

In the methods disclosed in the aforementioned patent documents, devices are connected to each other through wire communication to set communication parameters. These methods have a disadvantage in that devices need to be connected to each other with a cable and thus the operation may be cumbersome. In view of this disadvantage, methods for setting communication parameters by using wireless communication have been developed.

Such methods are disclosed in, for example, United States Patent Application Nos. 20040076300 and 20050201557.

However, when communication parameters are set by using wireless communication, the following two cases need to be prevented from occurring: a first case where communication parameters are intercepted by an eavesdropping attacker and a second case where communication parameters are set in a device that is not specified or a device with which someone (a brute force attacker) intends to carry out an illegal activity because it is difficult to determine a device that needs to be set up.

In the methods disclosed in United States Patent Application Nos. 20040076300 and 20050201557, the range of radio waves made available for communication is narrowed down at the time of setting so that the range becomes narrower than a normal communication range, and thus the aforementioned two cases may be prevented from occurring.

FIG. 19 shows a range within which communication parameters can be set for devices. In FIG. 19, reference number 101 denotes a wireless access point, reference numbers and letters 102A and 102B denote wireless terminals that communicate with the wireless access point 101 through air, and reference letters AR and MR denote a normal wireless communication area and a wireless communication area for setting, respectively.

Communication parameters can be set for the wireless terminal 102A, which is used in the wireless communication area MR for setting, without the wireless terminal 102A being moved from the current area, as shown in FIG. 19. However, when communication parameters are set for the wireless terminal 102B, which is used in an area outside the wireless communication area MR for setting, the wireless terminal 102B needs to be temporarily moved into the wireless communication area MR for setting. Then, the wireless terminal 102B needs to be moved back into the original area, in which the wireless terminal 102B is used in a normal operation, after the communication parameters have been set.

When the wireless terminal 102B is a terminal that can be readily moved, for example, a notebook PC or a digital camera, the setting operation may not be cumbersome for the user. In contrast, when the wireless terminal 102B is a terminal that cannot be readily moved, for example, a desktop PC or a printer, the setting operation may be very cumbersome for the user.

SUMMARY OF THE INVENTION

Embodiments of the present invention are provided to flexibly set communication parameters in response to the environment in which communication devices are installed.

In a first aspect of the present invention, a method for setting communication parameters in a number of communication devices is provided. The communication parameters are used for communication. The method includes setting communication parameters without an authentication process being performed for a second communication device in a case where a first communication device has received a request for setting communication parameters from the second communication device within a predetermined period of time from the start of setting communication parameters. The method further includes setting communication parameters after the authentication process has been performed for the second communication device in a case where the first communication device has received a request for setting communication parameters from the second communication device after the expiration of the predetermined period of time from the start of setting communication parameters.

Moreover, in a second aspect of the present invention, a communication device to set communication parameters that are used to communicate with another communication device is provided. The communication device includes a transmitting unit configured to transmit, in response to an input instruction for starting to set communication parameters, information indicating that setting of communication parameters has been started to the other communication device, a timer configured to measure a predetermined period of time in response to the input instruction for starting to set communication parameters, and a communication-parameter setting unit configured to set communication parameters after an authentication has been performed for the other communication device, depending on whether the communication device has received a request for setting communication parameters from the other communication device within the predetermined period of time.

Moreover, in a third aspect of the present invention, a method for setting communication parameters in a plurality of communication devices is provided, the communication parameters being used for communication. The method includes starting to set communication parameters, and setting communication parameters after an authentication process has been performed for another communication device, depending on whether a request for setting communication parameters has been received from the other communication device within a predetermined period of time from the start of setting communication parameters.

Further features of the present invention will become apparent from the following description of exemplary embodiments with reference to the attached drawings.

BRIEF DESCRIPTION OF THE DRAWINGS

FIG. 8 shows an exemplary frame format of a beacon that is defined by the IEEE 802.11 standard.

DESCRIPTION OF THE EMBODIMENTS

Exemplary embodiments according to the present invention will now be described in detail with reference to the drawings.

First Exemplary Embodiment

Figure 1:
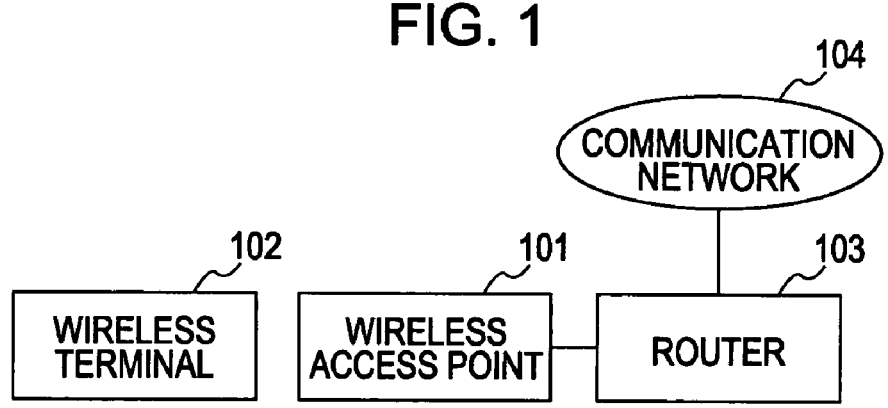
FIG. 1 shows exemplary devices coupled to a communication network according to exemplary embodiments of the present invention.

FIG. 1 shows exemplary devices coupled to a communication network according to exemplary embodiments of the present invention. In FIG. 1, a wireless access point 101 is, in an exemplary embodiment, a wireless LAN, for example, in the infrastructure mode based on the IEEE 802.11. In an exemplary embodiment, a wireless terminal 102 is a wireless communication device that can participate in, for example, a wireless LAN based on the IEEE 802.11. Then, a router 103 is a device that connects the wireless access point 101 to a communication network 104, such as the Internet.

The components and operation of each of the wireless access point 101 and the wireless terminal 102, which have a function of setting communication parameters, will now be described with reference to FIGS. 2 and 3.

Figure 2:
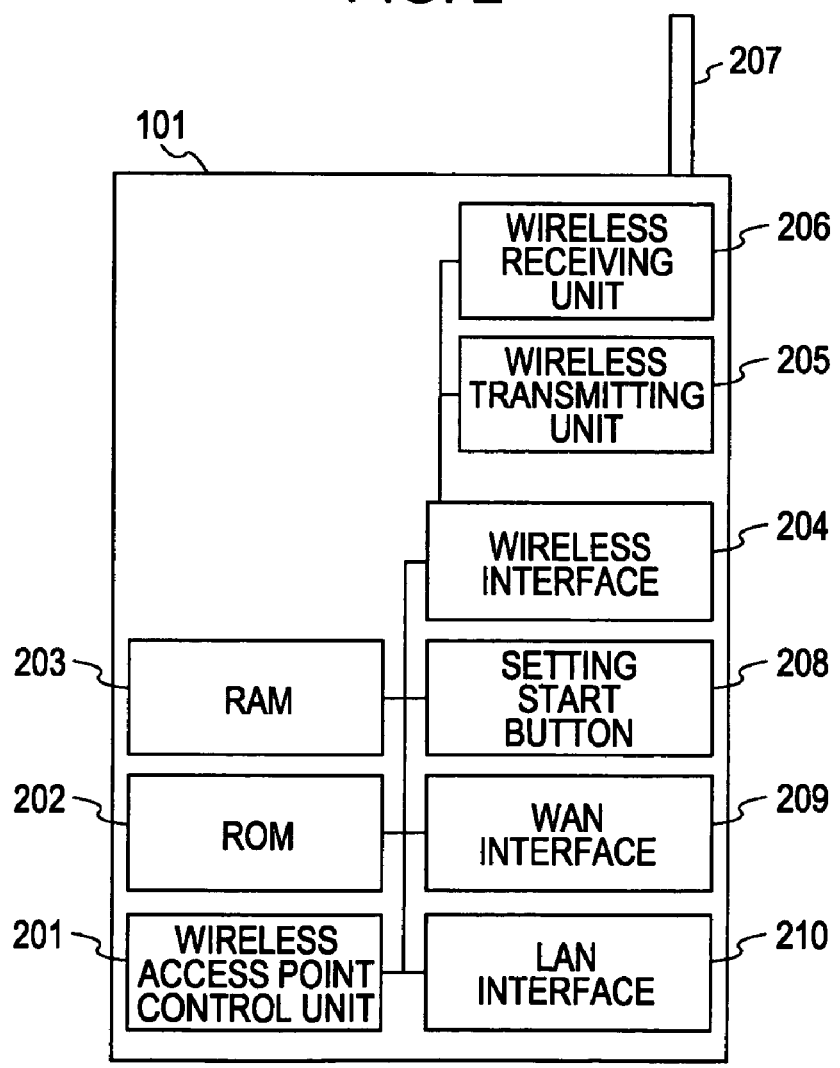
FIG. 2 is an outline block diagram showing components of an exemplary wireless access point.

FIG. 2 is an outline block diagram showing components of an exemplary wireless access point 101. The wireless access point 101 includes a wireless access point control unit 201, a read only memory (ROM) 202, a random access memory (RAM) 203, a wireless interface 204, a wireless transmitting unit 205, a wireless receiving unit 206, an antenna 207, a setting start button 208, a wide area network (WAN) interface 209 that connects to the communication network 104 via the router 103, and a LAN interface 210.

Figure 3:
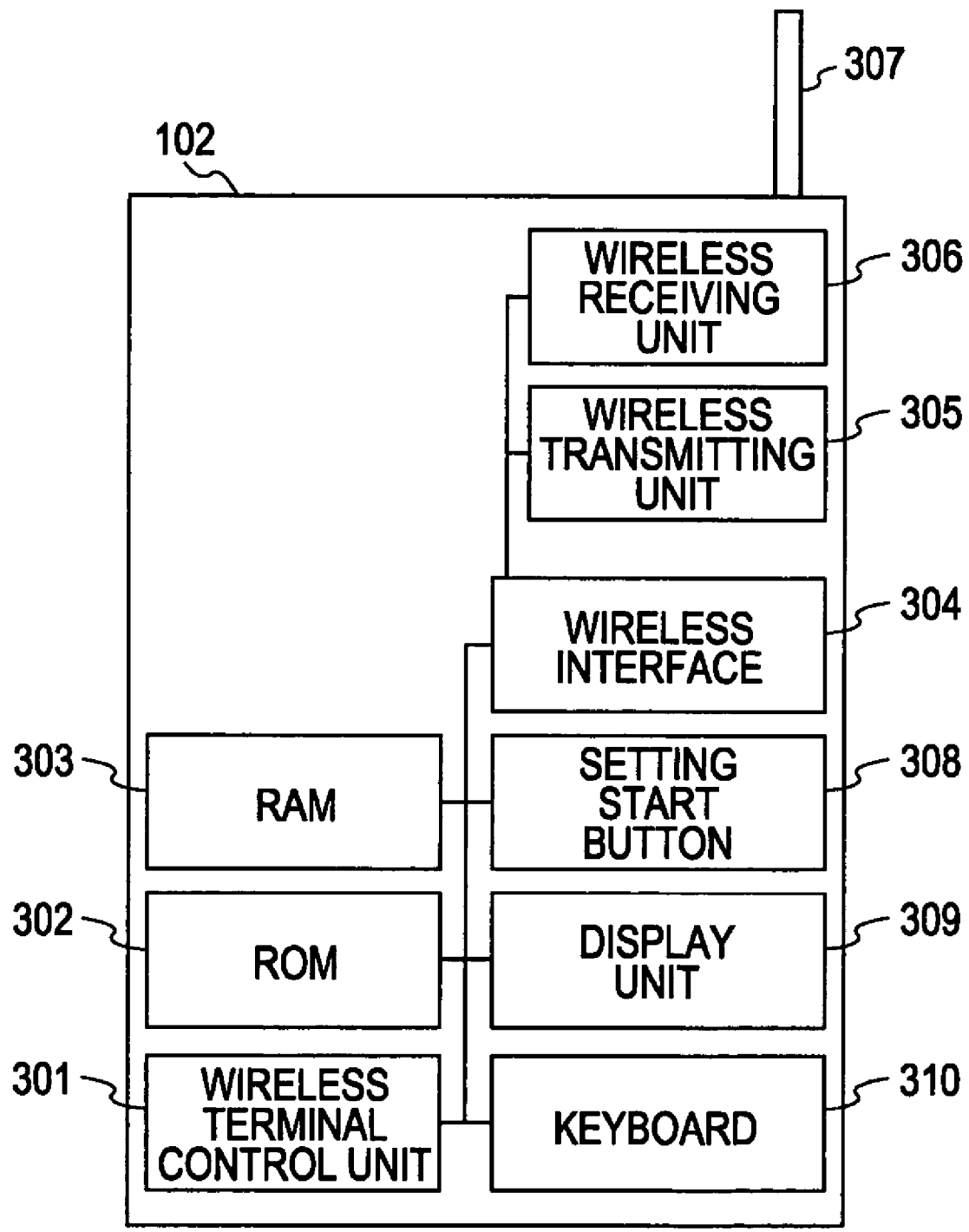
FIG. 3 is an outline block diagram showing components of an exemplary wireless terminal.

FIG. 3 is an outline block diagram showing components of an exemplary wireless terminal 102. The wireless terminal 102 includes a wireless terminal control unit 301, a ROM 302, a RAM 303, a wireless interface 304, a wireless transmitting unit 305, a wireless receiving unit 306, an antenna 307, a setting start button 308, a display unit 309, and a keyboard 310 for inputting information such as characters.

The following two methods are provided for starting to set communication parameters in the wireless access point 101 and the wireless terminal 102.

[First Method for Starting to Set Communication Parameters]

In a first method for starting to set communication parameters, a user presses the setting start button 208 of the wireless access point 101 and the setting start button 308 of the wireless terminal 102 at the same time.

[Second Method for Starting to Set Communication Parameters]

In a second method for starting to set communication parameters, the user first presses the setting start button 208 of the wireless access point 101. Then, the user presses the setting start button 308 of the wireless terminal 102 and then inputs a password through the keyboard 310, or the user inputs a password through the keyboard 310 and then presses the setting start button 308 of the wireless terminal 102.

In the first method, the setting start buttons 208 and 308 are pressed at the same time to determine devices that need to be set up. The first method is easy for the user. However, when the devices are distant from each other, it is difficult to press the setting start buttons 208 and 308 at the same time unless more than one person perform setting.

In the second method, a password is input to determine devices that need to be set up. Thus, even when the devices are distant from each other and the setting start buttons 208 and 308 cannot be pressed at the same time, the user can readily perform setting.

A method according to the first exemplary embodiment that includes the first and second methods for starting to set communication parameters will now be described with reference to FIGS. 1 to 8.

The method for staring to set communication parameters in the wireless access point 101 and the wireless terminal 102 will be described in detail.

Although the setting procedure of communication parameters is started between a wireless access point and a wireless terminal in this exemplary embodiment, the present invention is also applicable to a case where the setting procedure of communication parameters is started between a wireless access point and more than one wireless terminal.

Figure 4:
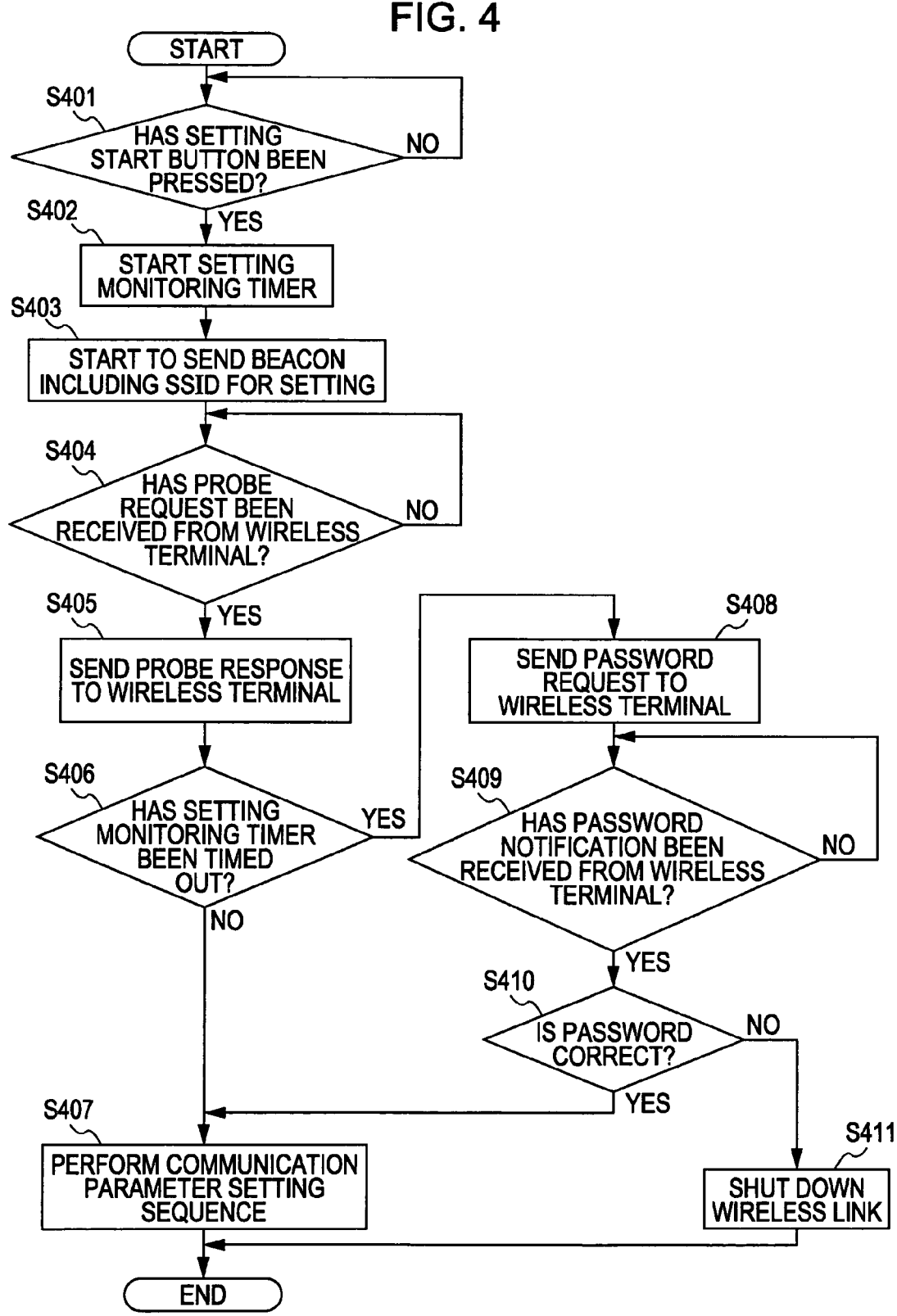
FIG. 4 is a flowchart showing the control process of a wireless access point control unit in the wireless access point according to the first exemplary embodiment.
Figure 5:
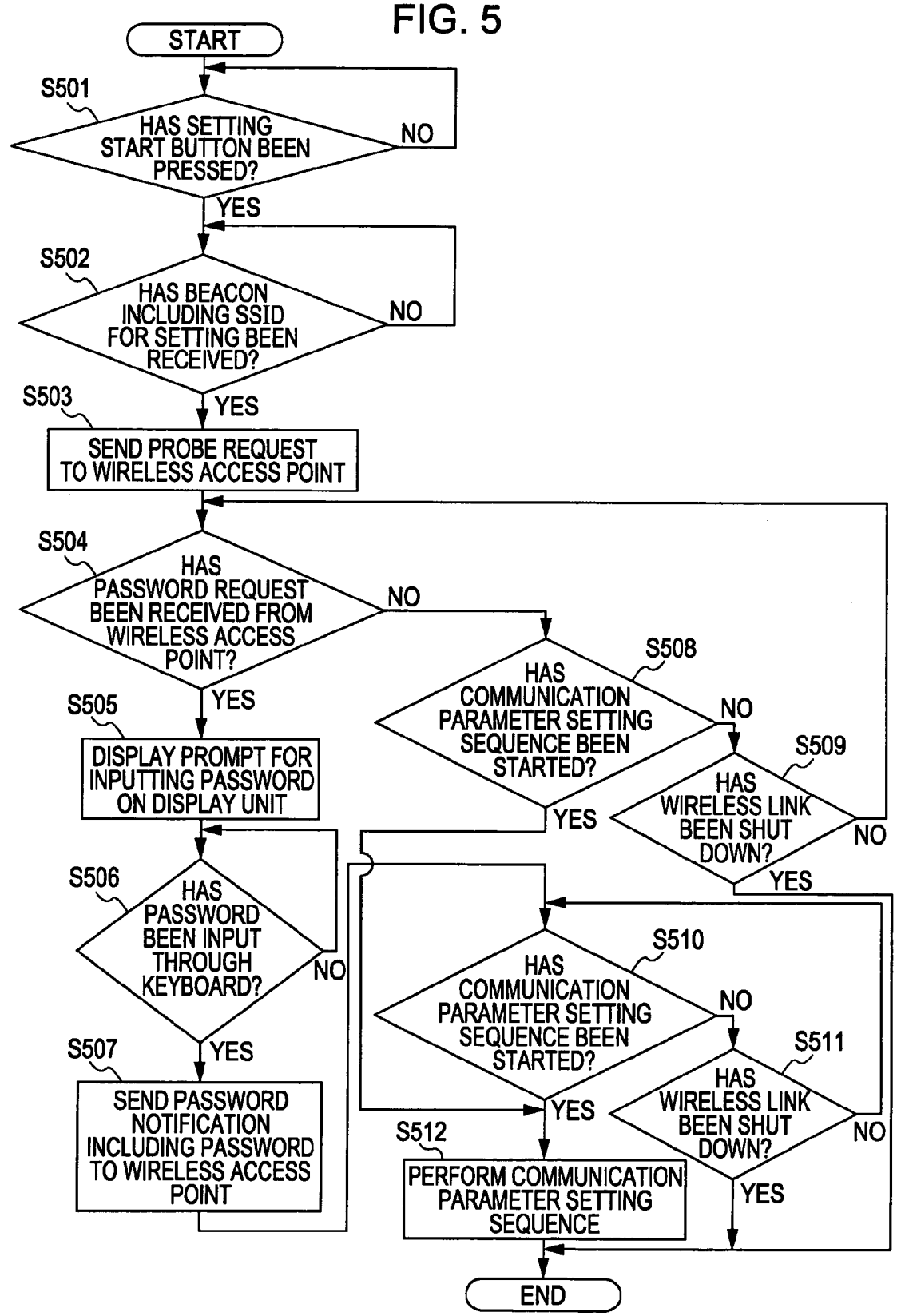
FIG. 5 is a flowchart showing the control process of a wireless terminal control unit in the wireless terminal according to the first exemplary embodiment.

FIG. 4 is a flowchart showing the control process of the wireless access point control unit 201 in the wireless access point 101 according to the first exemplary embodiment. FIG. 5 is a flowchart showing the control process of the wireless terminal control unit 301 in the wireless terminal 102 according to the first exemplary embodiment.

Figure 6:
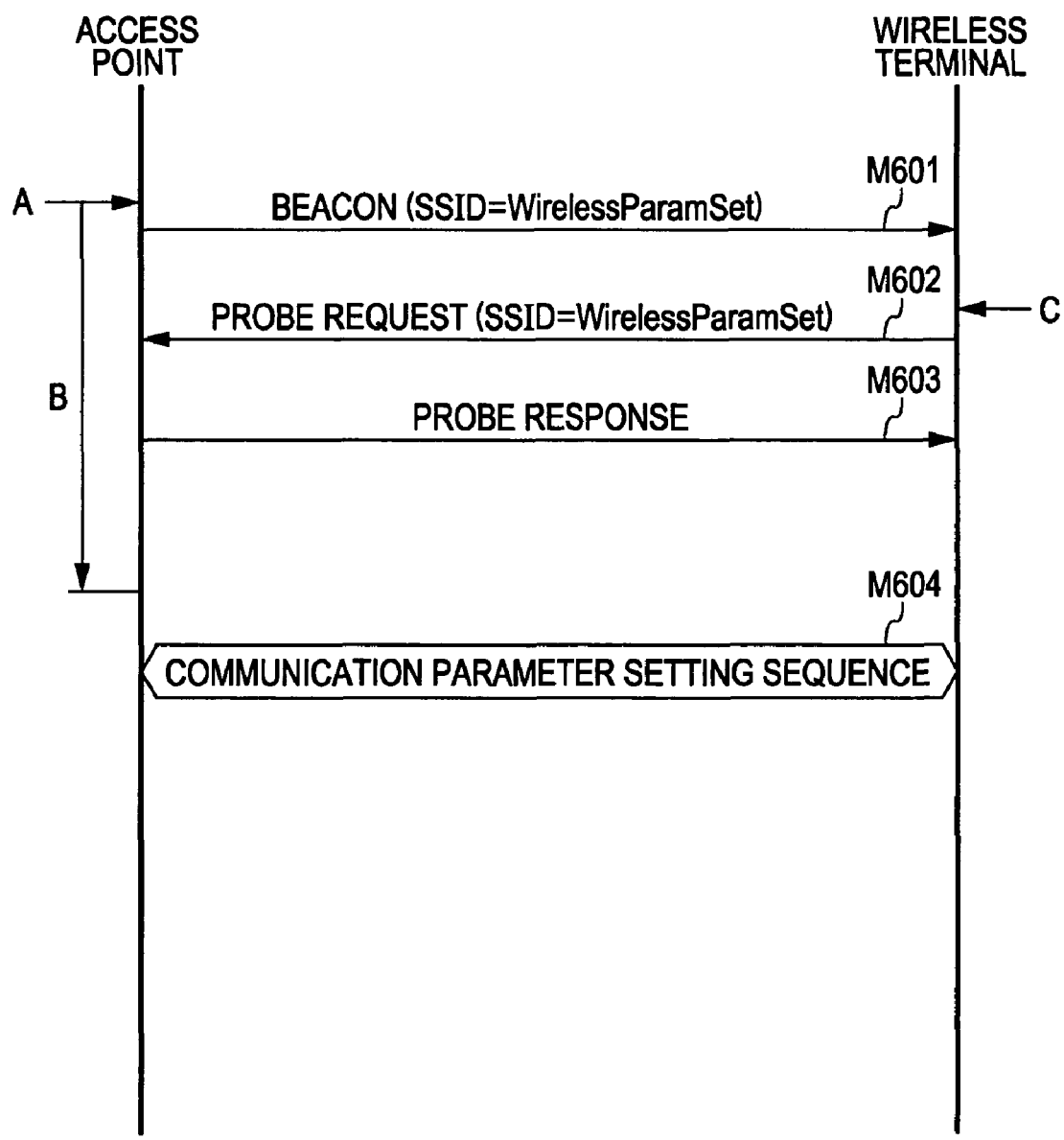
FIG. 6 shows the sequence that is performed between the wireless access point and the wireless terminal according to the first exemplary embodiment in a case where a notification of the start of setting communication parameters is made within a predetermined period of time.
Figure 7:
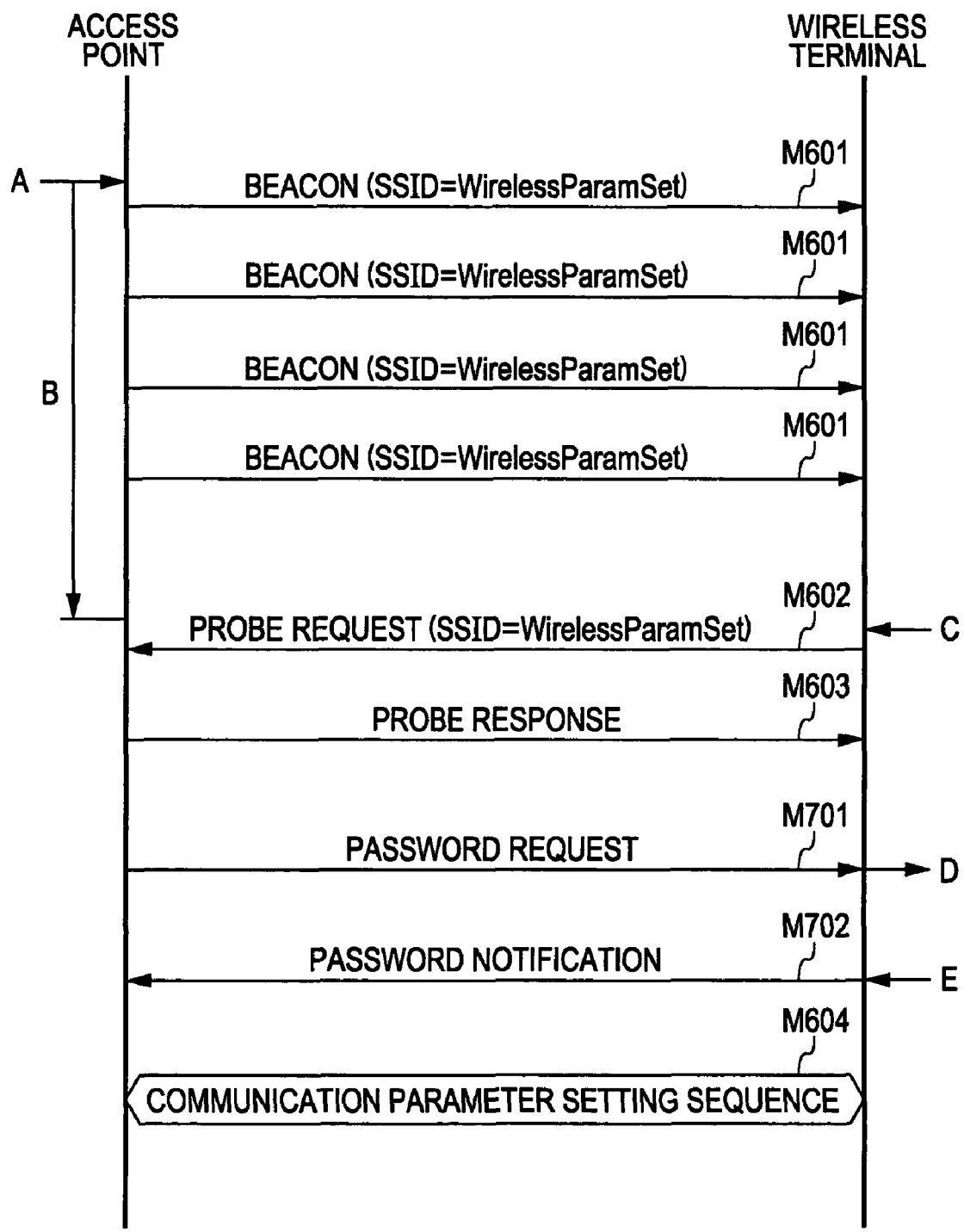
FIG. 7 shows the sequence that is performed between the wireless access point and the wireless terminal according to the first exemplary embodiment in a case where a notification of the start of setting communication parameters is made after the expiration of the predetermined period of time.

FIG. 6 shows the sequence that is performed between the wireless access point 101 and the wireless terminal 102 in a case where a notification of the start of setting communication parameters is made within a predetermined period of time, according to the first exemplary embodiment. FIG. 7 shows the sequence that is performed between the wireless access point 101 and the wireless terminal 102 in a case where a notification of the start of setting communication parameters is made after the expiration of the predetermined period of time, according to the first exemplary embodiment.

In a wireless LAN system, an SSID is used as an ID for identifying service to which the user is to connect, and the wireless access point 101 is identified by the SSID in the actual operation. In a normal communication mode, the wireless access point 101 sends a beacon that includes the SSID at regular intervals. The wireless terminal 102 that holds the information of the SSID included in the beacon sent from the wireless access point 101 can recognize and communicate with the wireless access point 101, to which the wireless terminal 102 is to connect, by receiving the beacon.

FIG. 8 shows an exemplary frame format of a beacon that is defined by the IEEE 802.11 standard. This frame format is applicable when the type and subtype fields in the frame control field of the media access control (MAC) frame indicate "management" and "beacon", respectively. A beacon includes an SSID field, as shown in FIG. 8.

Before communication parameters are set in the wireless access point 101 and the wireless terminal 102, the wireless terminal 102 does not usually hold the information of the SSID of the wireless access point 101. Thus, an SSID for setting is determined in the wireless access point 101 and the wireless terminal 102 in advance, and the SSID for setting is used in communication that is performed between the wireless access point 101 and the wireless terminal 102 to set communication parameters.

The user of the wireless access point 101 first presses the setting start button 208 to start to set communication parameters. At this time, in step S401, the wireless access point control unit 201 in the wireless access point 101 monitors the status of the setting start button 208. When the wireless access point control unit 201 detects that the setting start button 208 has been pressed, the process proceeds to step S402. Reference letter A in FIGS. 6 and 7 denotes the timing when the user presses the setting start button 208. In step S402, the wireless access point control unit 201 sets a setting monitoring timer T1 to start timing. Reference letter B in FIGS. 6 and 7 denotes the period of time in which the setting monitoring timer T1 is turned on. Then, in step S403, transmission of a beacon M601 that includes an SSID for setting is started. In the cases shown in FIGS. 6 and 7, the SSID for setting is "WirelessParamSet". Then, in step S404, the wireless access point 101 waits for the reception of a probe request M602 from the wireless terminal 102.

Then, the user of the wireless terminal 102 presses the setting start button 308 to start to set communication parameters. At this time, in step S501, the wireless terminal control unit 301 in the wireless terminal 102 monitors the status of the setting start button 308. When the wireless terminal control unit 301 detects that the setting start button 308 has been pressed, the process proceeds to step S502. Reference letter C in FIGS. 6 and 7 denotes the timing when the user presses the setting start button 308. In step S502, the wireless terminal control unit 301 waits for the reception of the beacon M601 that includes the SSID for setting from the wireless access point 101. When the beacon M601 that includes the SSID for setting has been received, the process proceeds to step S503. In step S503, the probe request M602 is sent to the wireless access point 101 to start to set communication parameters.

On the other hand, when the wireless access point 101 has received the probe request M602 from the wireless terminal 102, the process proceeds to step S405. In step S405, the wireless access point 101 sends a probe response M603 that is the response to the probe request M602 to the wireless terminal 102. Then, in step S406, the wireless access point control unit 201 determines whether the setting monitoring timer T1 has been timed out. When the wireless access point control unit 201 determines that the setting monitoring timer T1 has not been timed out, the process proceeds to step S407 where a communication parameter setting sequence M604 is started between the wireless access point 101 and the wireless terminal 102, as shown in FIG. 6. On the other hand, when the wireless access point control unit 201 determines that the setting monitoring timer T1 has been timed out, the process proceeds to step S408 where a password request M701 is sent to the wireless terminal 102, as shown in FIG. 7.

At this time, the wireless terminal 102 waits for the reception of the password request M701 from the wireless access point 101 in step S504, waits for the start of the communication parameter setting sequence M604 between the wireless access point 101 and the wireless terminal 102 in step S508, and waits to detect the shutdown of the wireless link in step S509.

In this state, when the communication parameter setting sequence M604 has been started between the wireless access point 101 and the wireless terminal 102, the process proceeds to step S512 where the communication parameter setting sequence M604 is performed. After step S512, the process shown in FIG. 5 is completed. Alternatively, when the wireless terminal 102 has received the password request M701, the process proceeds to step S505. In step S505, a prompt for inputting a password, for example, "Password?", is displayed on the display unit 309. Reference letter D in FIG. 7 denotes the timing when the prompt is displayed on the display unit 309. Then, in step S506, the wireless terminal 102 monitors the input of a password through the keyboard 310. When a password has been input, the process proceeds to step S507 where a password notification M702 that includes the input password is sent to the wireless access point 101. Reference letter E in FIG. 7 denotes the timing when a password is input. Then, the wireless terminal 102 waits for the start of the communication parameter setting sequence M604 in step S510 and waits to detect the shutdown of the wireless link in step S511. In this state, when the communication parameter setting sequence M604 has been started, the process proceeds to step S512 where the communication parameter setting sequence M604 is performed. After step S512, the process shown in FIG. 5 is completed.

On the other hand, in step S409, the wireless access point 101 waits for the reception of the password notification M702 from the wireless terminal 102 after the password request M701 has been sent to the wireless terminal 102 in step S408. When the wireless access point 101 has received the password notification M702, the process proceeds to step S410. In step S410, the password included in the password notification M702 is compared with a predetermined password stored in the wireless access point 101 in advance. When the password included in the password notification M702 has matched the predetermined password, the process proceeds to step S407 where the communication parameter setting sequence M604 is performed between the wireless access point 101 and the wireless terminal 102, as shown in FIG. 7. Otherwise, the process proceeds to step S411 where the wireless link is shut down. After step S407 or S411, the process shown in FIG. 4 is completed. When the wireless access point 101 has shut down the wireless link in step S411, the wireless terminal 102 completes the process shown in FIG. 5.

In the first exemplary embodiment, when the wireless access point 101 has received the probe request M602 for starting to set communication parameters from the wireless terminal 102 during the period between the time when the wireless access point 101 starts to set communication parameters and the time when the setting monitoring timer T1 is timed out, communication parameters can be set in the wireless access point 101 and the wireless terminal 102 according to the first method for starting to set communication parameters without the user of the wireless terminal 102 being requested to input a password.

Alternatively, when the wireless access point 101 has received the probe request M602 for starting to set communication parameters from the wireless terminal 102 after the setting monitoring timer T1 has been timed out, communication parameters can be set in the wireless access point 101 and the wireless terminal 102 according to the second method for starting to set communication parameters with the user of the wireless terminal 102 being requested to input a password.

In the first method for starting to set communication parameters, setting of communication parameters can be started merely by pressing the setting start button 308 in the wireless terminal 102. Thus, when a large value is set for the setting monitoring timer T1, it is highly probable that setting of communication parameters in a device that is not specified or a device with which someone intends to carry out an illegal activity is started. Accordingly, the value set for the setting monitoring timer T1 should be the minimum value.

Moreover, in the first method for starting to set communication parameters, a device that needs to be set up is determined by pressing the setting start button 208 in the wireless access point 101 and the setting start button 308 in the wireless terminal 102 at the same time. Thus, the communication parameter setting sequence is started without an authentication process.

On the other hand, in the second method for starting to set communication parameters, in a case where it is impossible or difficult to press the setting start buttons 208 and 308 at the same time, for example, where the wireless access point 101 is distant from the wireless terminal 102, the communication parameter setting sequence is started after an authentication process has been performed. Specifically, a device that needs to be set up is determined by the following process: The user presses the setting start button 308 in the wireless terminal 102 after having pressed the setting start button 208 in the wireless access point 101. Then, the user inputs a password through the keyboard 310.

In the first exemplary embodiment, either of the aforementioned two methods for starting to set communication parameters can be performed in response to the environment in which communication devices are installed. Thus, communication parameters can be readily set in the wireless access point 101 and the wireless terminal 102 and other wireless terminals within the communication range of the wireless access point 101.

Second Exemplary Embodiment

A second exemplary embodiment according to the present invention will now be described in detail with reference to the drawings. In the first exemplary embodiment, in a case where the wireless access point 101 has received the probe request for starting to set communication parameters from the wireless terminal 102, when the setting monitoring timer T1 has been timed out, the wireless access point 101 sends the password request to the wireless terminal 102. In the second exemplary embodiment, the wireless terminal 102 sends the information of the password to the wireless access point 101 when requesting the wireless access point 101 to start to set communication parameters.

The components of a communication network, a wireless access point 101, and a wireless terminal 102 according to the second exemplary embodiment are the same as or similar to those according to the first exemplary embodiment, and the description of these components is omitted.

A method according to the second exemplary embodiment that includes the first and second methods for starting to set communication parameters will now be described with reference to FIGS. 1 to 3 and FIGS. 8 to 12.

Figure 9:
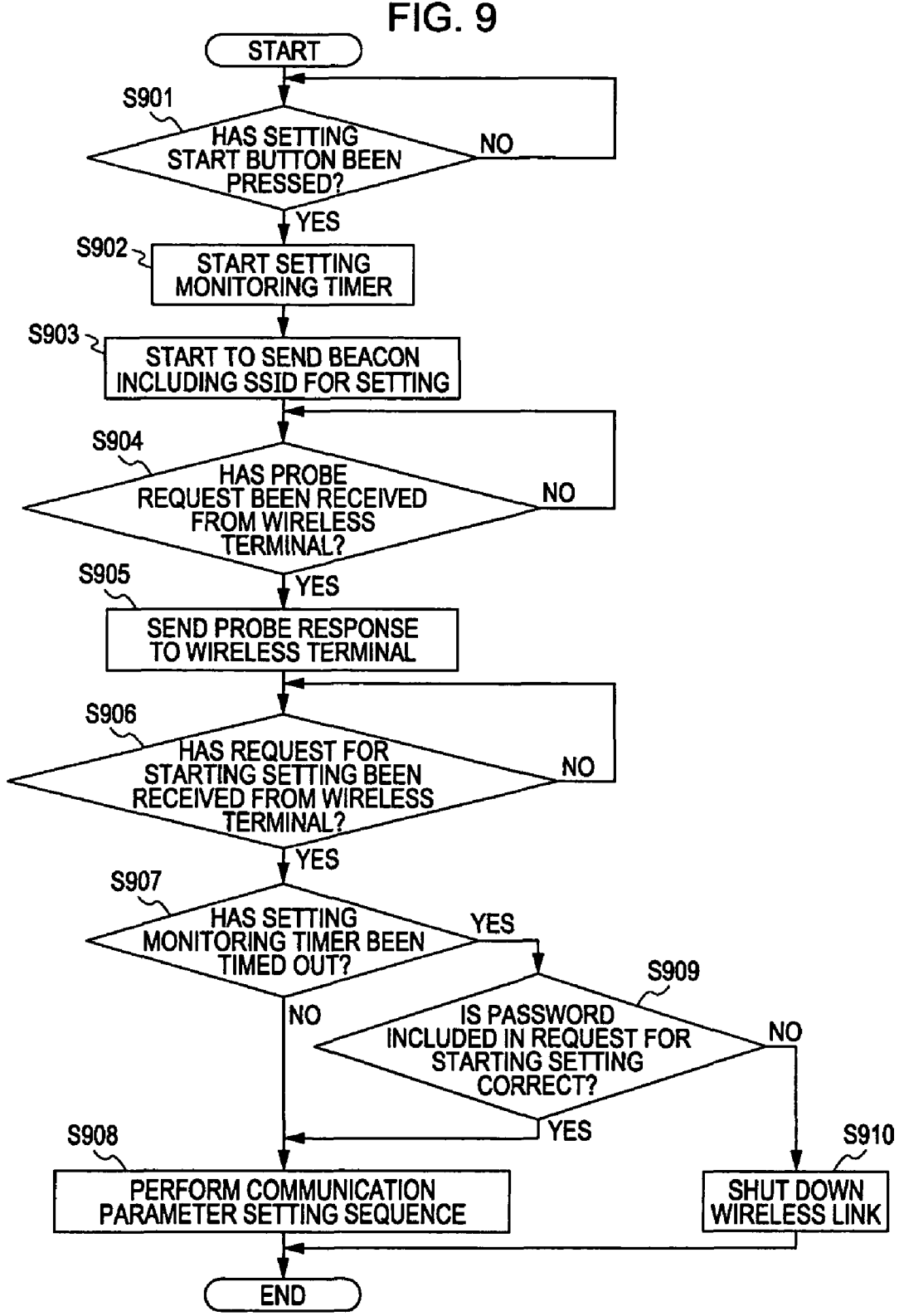
FIG. 9 is a flowchart showing the control process of a wireless access point control unit in a wireless access point according to a second exemplary embodiment.
Figure 10:
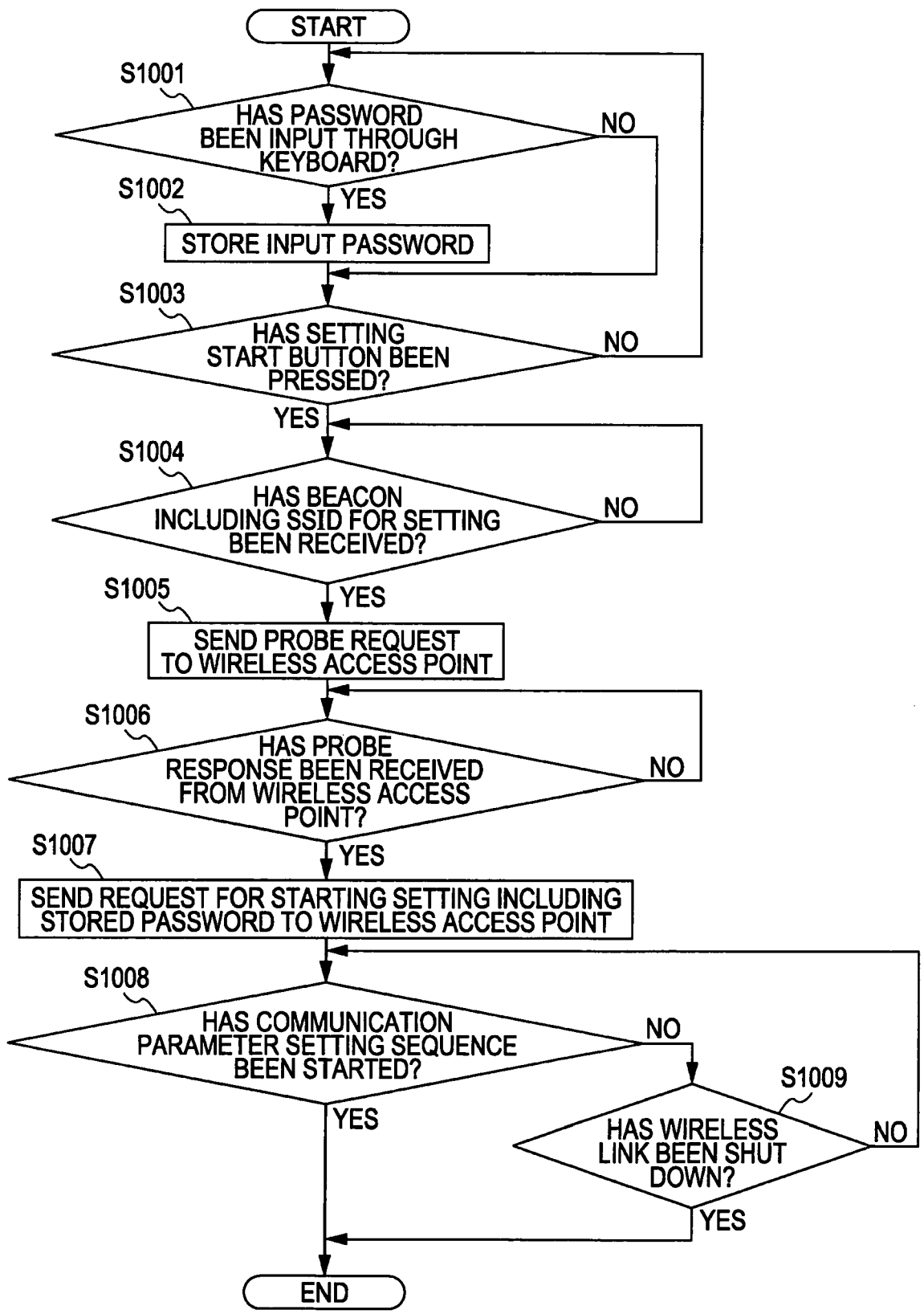
FIG. 10 is a flowchart showing the control process of a wireless terminal control unit in a wireless terminal according to the second exemplary embodiment.

FIG. 9 is a flowchart showing the control process of the wireless access point control unit 201 in the wireless access point 101 according to the second exemplary embodiment. FIG. 10 is a flowchart showing the control process of the wireless terminal control unit 301 in the wireless terminal 102 according to the second exemplary embodiment.

Figure 11:
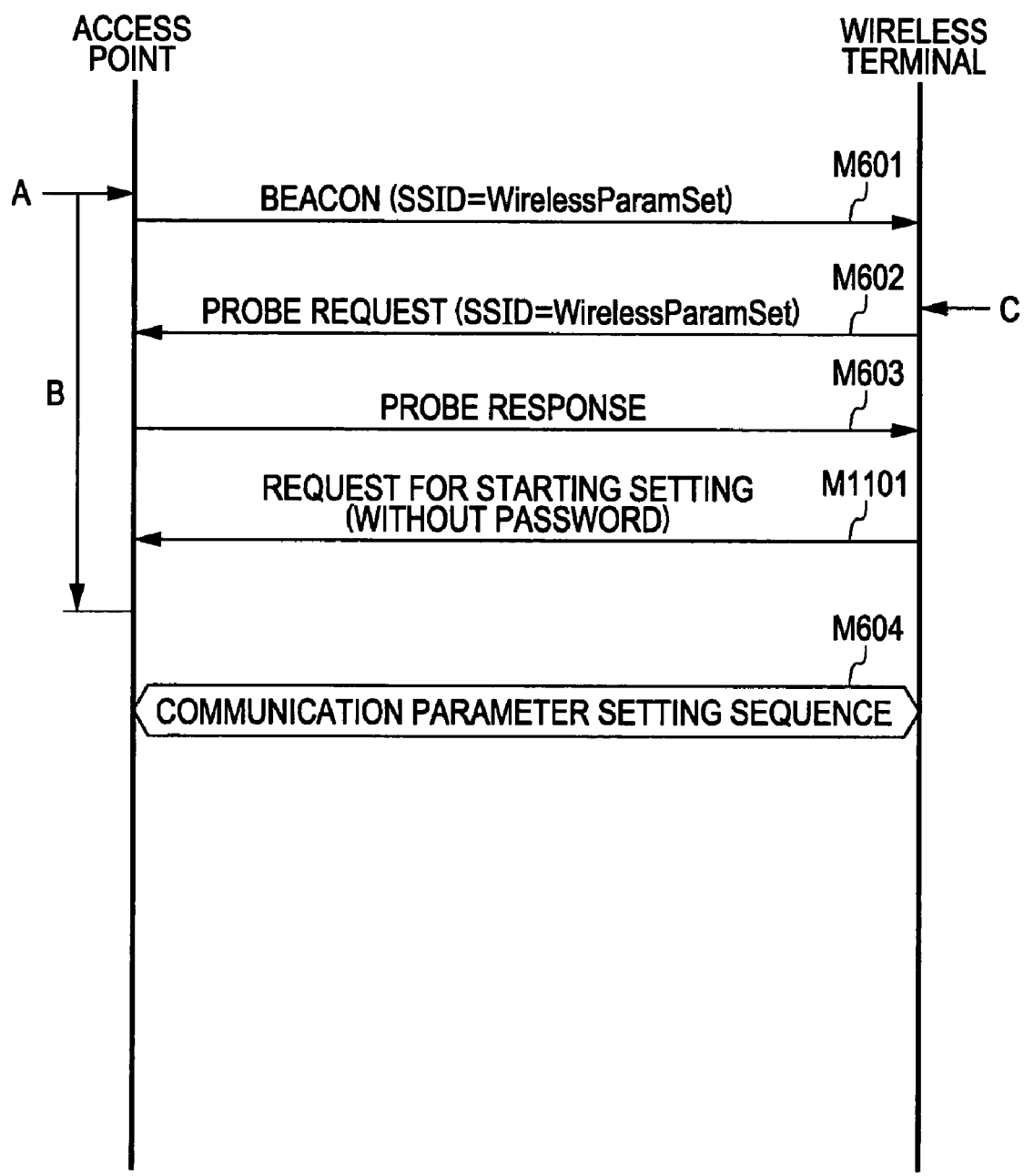
FIG. 11 shows the sequence that is performed between the wireless access point and the wireless terminal according to the second exemplary embodiment in a case where a request for starting setting is sent within a predetermined period of time.
Figure 12:
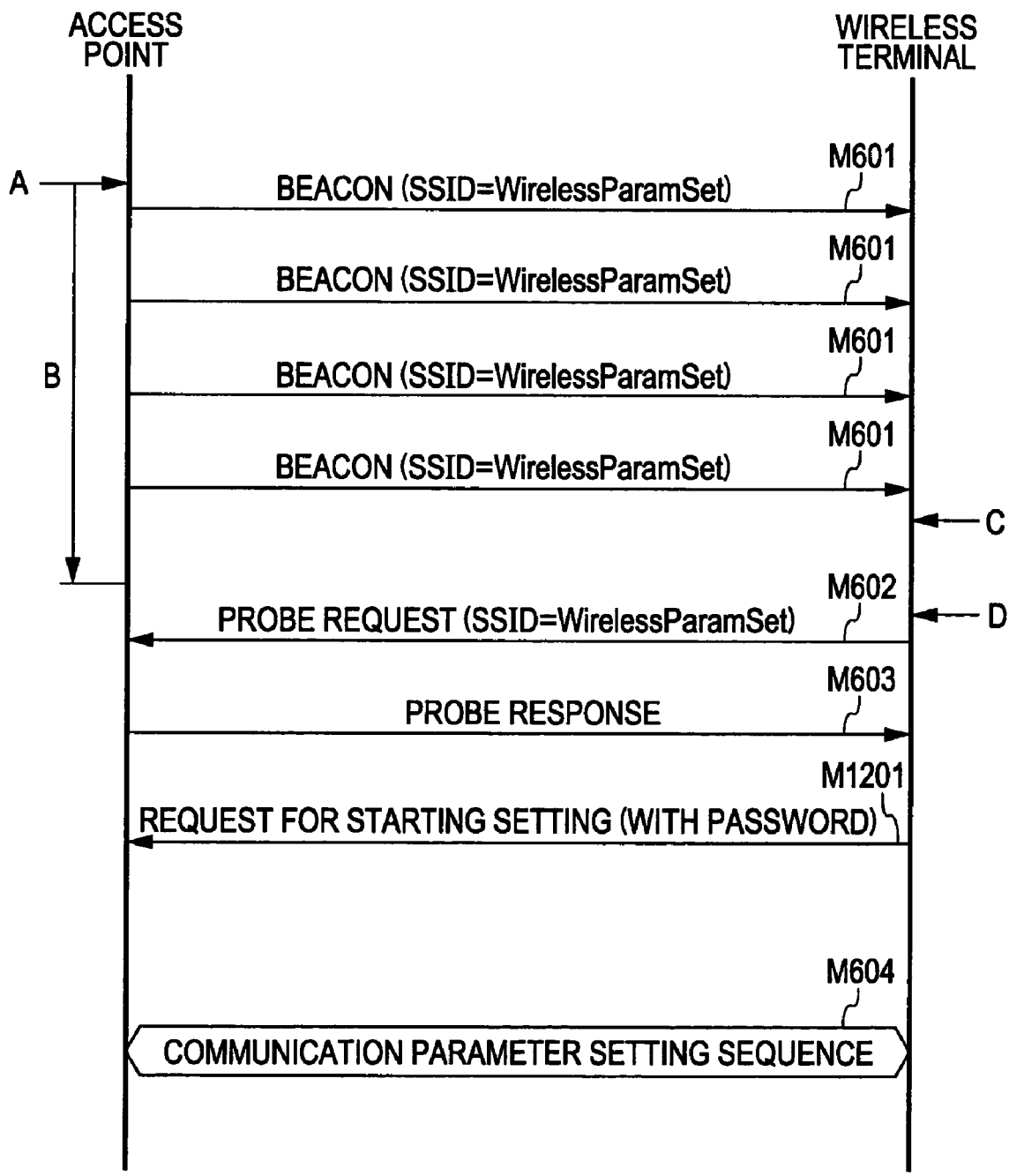
FIG. 12 shows the sequence that is performed between the wireless access point and the wireless terminal according to the second exemplary embodiment in a case where a request for starting setting is sent after the expiration of the predetermined period of time.

FIG. 11 shows the sequence that is performed between the wireless access point 101 and the wireless terminal 102 in a case where a request for starting setting is sent within a predetermined period of time. FIG. 12 shows the sequence that is performed between the wireless access point 101 and the wireless terminal 102 in a case where a request for starting setting is sent after the expiration of the predetermined period of time.

In the second exemplary embodiment, an SSID for setting is predetermined in a case where communication parameters are set in the wireless access point 101 and the wireless terminal 102, as in the first exemplary embodiment. Then, the SSID for setting is used in communication that is performed between the wireless access point 101 and the wireless terminal 102 to set communication parameters.

The user of the wireless access point 101 first presses the setting start button 208 to start to set communication parameters. At this time, in step S901, the wireless access point control unit 201 in the wireless access point 101 monitors the status of the setting start button 208. When the wireless access point control unit 201 detects that the setting start button 208 has been pressed, the process proceeds to step S902. Reference letter A in FIGS. 11 and 12 denotes the timing when the user presses the setting start button 208. In step S902, the wireless access point control unit 201 sets the setting monitoring timer T1 to start timing. Reference letter B in FIGS. 11 and 12 denotes the period of time in which the setting monitoring timer T1 is turned on. Then, in step S903, transmission of the beacon M601 that includes an SSID for setting is started. In the cases shown in FIGS. 11 and 12, the SSID for setting is "WirelessParamSet". Then, in step S904, the wireless access point 101 waits for the reception of the probe request M602 from the wireless terminal 102.

Then, the user of the wireless terminal 102 presses the setting start button 308 to start to set communication parameters. When setting of communication parameters is started by the first method for starting to set communication parameters, the user of the wireless terminal 102 presses the setting start button 308 without inputting a password through the keyboard 310. Alternatively, when setting of communication parameters is started by the second method for starting to set communication parameters, the user of the wireless terminal 102 first inputs a predetermined password through the keyboard 310 and then presses the setting start button 308.

The wireless terminal control unit 301 in the wireless terminal 102 monitors the input of a password through the keyboard 310 in step S1001 and waits in step S1003 to detect that the setting start button 308 has been pressed. When a password has been input, the process proceeds to step S1002. In step S1002, the wireless terminal control unit 301 stores the input password in a predetermined area in the RAM 303.

When the wireless terminal control unit 301 detects that the setting start button 308 has been pressed, the process proceeds to step S1004. Reference letter C in FIG. 11 and reference letter D in FIG. 12 denote the timing when the user presses the setting start button 308. Reference letter C in FIG. 12 denotes the timing when the user inputs a password. In step S1004, the wireless terminal control unit 301 waits for the reception of the beacon M601 that includes the SSID for setting from the wireless access point 101. When the beacon M601 that includes the SSID for setting has been received, the process proceeds to step S1005. In step S1005, the probe request M602 is sent to the wireless access point 101 to start to set communication parameters. Then, in step S1006, the wireless terminal control unit 301 waits for the reception of the probe response M603 from the wireless access point 101.

On the other hand, when the wireless access point 101 has received the probe request M602 from the wireless terminal 102, the process proceeds to step S905. In step S905, the wireless access point 101 sends the probe response M603 that is the response to the probe request M602 to the wireless terminal 102. Then, the process proceeds to step S906 where the wireless access point control unit 201 waits for the reception of a request M1201 for starting setting from the wireless terminal 102.

On the other hand, when the wireless terminal 102 has received the probe response M603 from the wireless access point 101, the process proceeds to step S1007. In step S1007, the wireless terminal 102 sends the request M1201 for starting setting that includes the user inputted password stored in the predetermined area in the RAM 303 to the wireless access point 101. Then, the wireless terminal 102 waits for the start of the communication parameter setting sequence M604 in step S1008 and waits in step S1009 to detect the shutdown of the wireless link.

When the user has pressed the setting start button 308 without having input a password, no password is stored in the RAM 303. Thus, the wireless terminal 102 sends a request M1101 for starting setting to the wireless access point 101, the request M1101 being a request that does not include a password.

On the other hand, when the wireless access point 101 has received the request M1101 or M1201 for starting setting from the wireless terminal 102, the process proceeds to step S907. In step S907, the wireless access point 101 determines whether the setting monitoring timer T1 has been timed out. When the wireless access point 101 determines that the setting monitoring timer T1 has not been timed out, the process proceeds to step S908. In step S908, the communication parameter setting sequence M604 is started between the wireless access point 101 and the wireless terminal 102, as shown in FIG. 11.

When the wireless access point 101 determines that the setting monitoring timer T1 has been timed out, the process proceeds to step S909. In step S909, the password included in the request M1201 for starting setting is compared with a predetermined password stored in the wireless access point 101 in advance. When the password included in the request M1201 has matched the predetermined password stored in the wireless access point 101, the process proceeds to step S908 where the communication parameter setting sequence M604 is started between the wireless access point 101 and the wireless terminal 102, as shown in FIG. 12. When the password included in the request M1201 does not match the predetermined password stored in the wireless access point 101, the process proceeds to step S910 where the wireless link is shut down. When the wireless link is shutdown in step S910, the wireless terminal 102 completes the process shown in FIG. 10. After step S908 or S910, the wireless access point 101 completes the process shown in FIG. 9.

In the first method for starting to set communication parameters, setting of communication parameters can be started merely by pressing the setting start button 308 in the wireless terminal 102. Thus, when a large value is set for the setting monitoring timer T1, it is highly probable that setting of communication parameters in a device that is not specified or a device with which someone intends to carry out an illegal activity is started. Accordingly, the value set for the setting monitoring timer T1 should be the minimum value.

In the second exemplary embodiment, in the second method for starting to set communication parameters, the wireless access point 101 does not send the password request to the wireless terminal 102 but the wireless terminal 102 attaches a password to the request M1201 for starting setting. Thus, communication parameters can be readily set in the wireless access point 101 and the wireless terminal 102 and other wireless terminals within the communication range of the wireless access point 101, as in the first exemplary embodiment.

Third Exemplary Embodiment

A third exemplary embodiment according to the present invention will now be described in detail with reference to the drawings. In the first and second exemplary embodiments, when the user of the wireless terminal 102 sets communication parameters, the user cannot determine whether a password needs to be input at the time of setting communication parameters. The third exemplary embodiment provides a solution to this problem. In particular, in the second exemplary embodiment, the user inputs a password through the keyboard 310 before pressing the setting start button 308. Thus, a message needs to be displayed on the display unit 309 to inform the user of the wireless terminal 102 whether a password needs to be input at the time of setting communication parameters.

The components of a communication network, a wireless access point 101, and a wireless terminal 102 according to the third exemplary embodiment are the same as or similar to those according to the first exemplary embodiment, and the description of these components is omitted.

In the third exemplary embodiment, messages corresponding to SSIDs for setting included in beacons from the wireless access point 101 are displayed on the display unit 309 in the wireless terminal 102 to inform the user whether a password needs to be input at the time of setting communication parameters.

Figure 13:
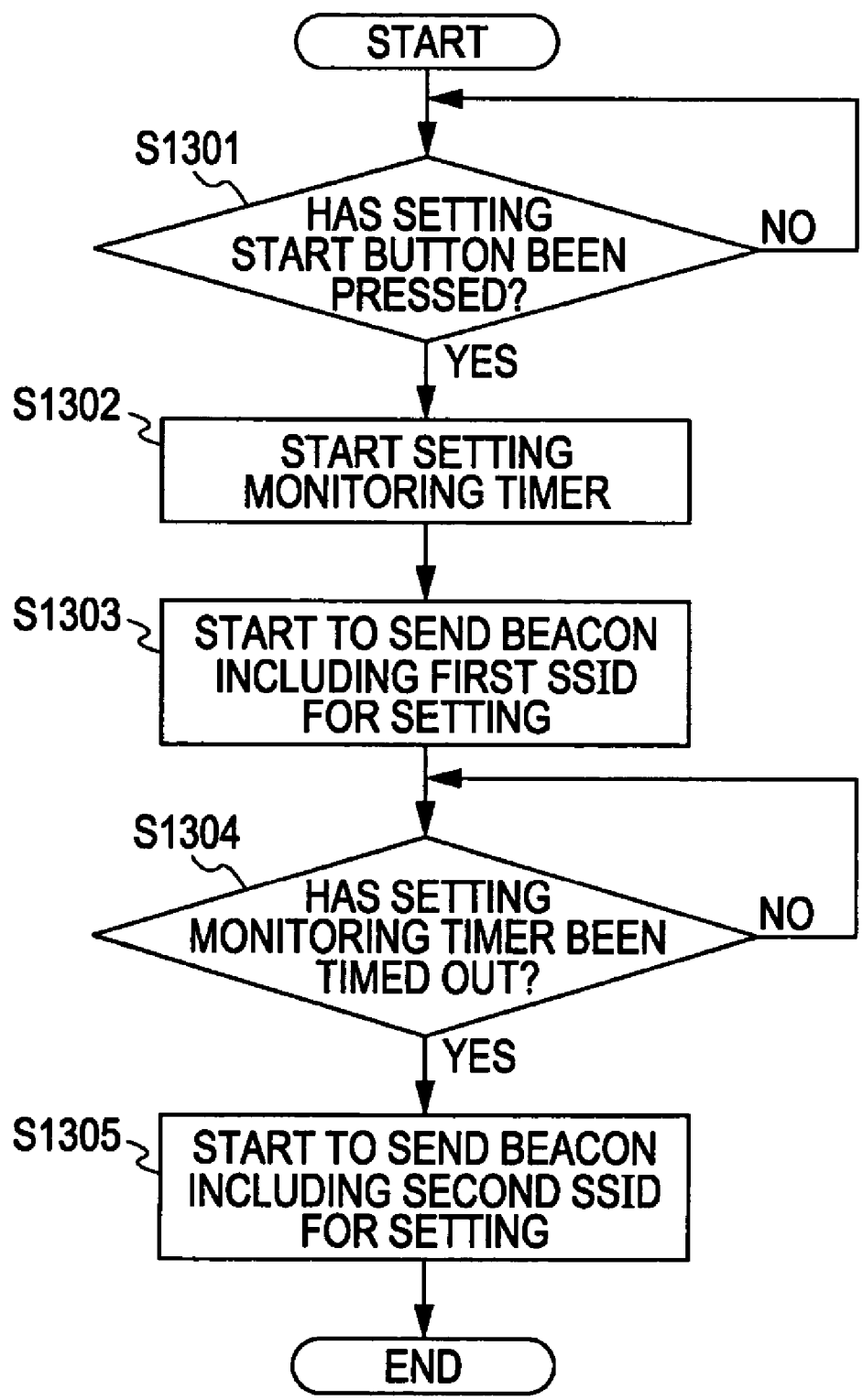
FIG. 13 is a flowchart showing the process of transmitting a beacon in a wireless access point control unit of a wireless access point according to a third exemplary embodiment.

FIG. 13 is a flowchart showing the process of transmitting a beacon in the wireless access point control unit 201 of the wireless access point 101.

Figure 14:
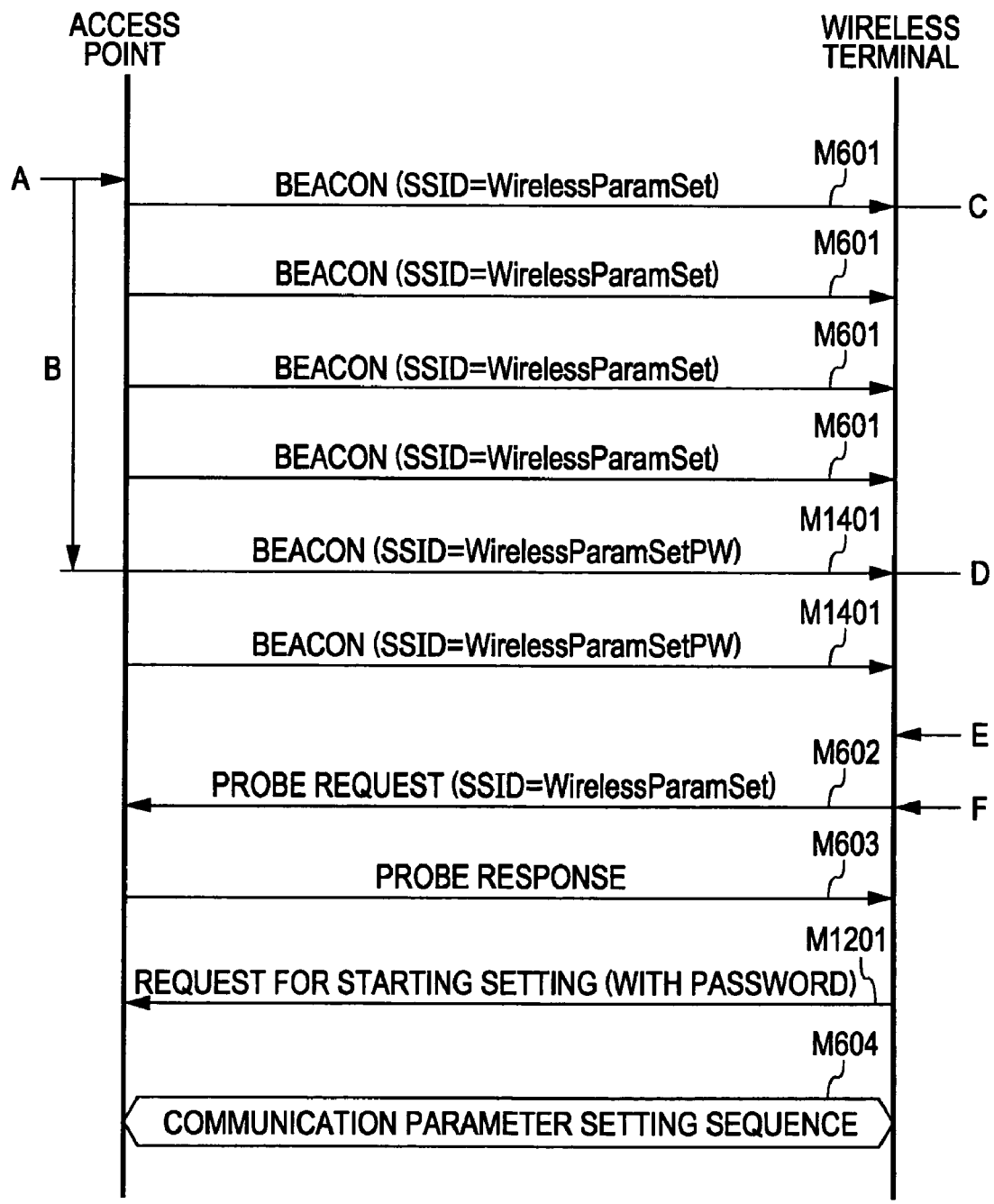
FIG. 14 shows the sequence that is performed between the wireless access point and a wireless terminal according to the third exemplary embodiment.

FIG. 14 shows the sequence that is performed between the wireless access point 101 and the wireless terminal 102 in the third exemplary embodiment.

In the third exemplary embodiment, SSIDs for setting are predetermined in a case where communication parameters are set in the wireless access point 101 and the wireless terminal 102, as in the aforementioned exemplary embodiments. Then, the SSIDs for setting are used in communication that is performed between the wireless access point 101 and the wireless terminal 102 to set communication parameters.

The user of the wireless access point 101 first presses the setting start button 208 to start to set communication parameters, as in the first and second exemplary embodiments. At this time, in step S1301, the wireless access point control unit 201 in the wireless access point 101 monitors the status of the setting start button 208. When the wireless access point control unit 201 detects that the setting start button 208 has been pressed, the process proceeds to step S1302 where the wireless access point control unit 201 sets the setting monitoring timer T1 to start timing. Reference letters A and B in FIG. 14 denote the timing when the user presses the setting start button 208 and the period of time in which the setting monitoring timer T1 is turned on, respectively. Then, in step S1303, the wireless access point 101 sends a beacon M601 that includes a first SSID for setting to the wireless terminal 102. Then, in step S1304, the wireless access point 101 determines whether the setting monitoring timer T1 has been timed out. When the setting monitoring timer T1 has been timed out, the process proceeds to step S1305 where the wireless access point 101 sends a beacon M1401 that includes a second SSID for setting to the wireless terminal 102. In the case shown in FIG. 14, the first SSID for setting is "WirelessParamSet", and the second SSID for setting is "WirelessParamSetPW". After step S1305, the process shown in FIG. 13 is completed.

On the other hand, when the wireless terminal 102 has received the beacon M601 that includes the first SSID for setting from the wireless access point 101, a first message, for example, "One-touch setting", is displayed on the display unit 309. Reference letter C in FIG. 14 denotes the timing when the first message is displayed on the display unit 309. Alternatively, when the wireless terminal 102 has received the beacon M1401 that includes the second SSID for setting from the wireless access point 101, a second message, for example, "Input password", is displayed on the display unit 309. Reference letters D, E, and F in FIG. 14 denotes the timing when the second message is displayed on the display unit 309, the timing when the user presses the setting start button 308, and the timing when the user inputs a password, respectively.

The other processes in the third exemplary embodiment are similar to those in the first and second exemplary embodiments, and the description of these processes is omitted.

In the third exemplary embodiment, when the user of the wireless terminal 102 sets communication parameters, the user can readily determine whether a password needs to be input at the time of setting communication parameters.

Fourth Exemplary Embodiment

A fourth exemplary embodiment according to the present invention will now be described in detail with reference to the drawings. In the fourth exemplary embodiment, in a case where the setting start button 308 in the wireless terminal 102 has been pressed, when the wireless terminal 102 has received the beacon M1401 that includes a second SSID for setting from the wireless access point 101, a prompt, for example, "Input password", is displayed on the display unit 309, as in the third exemplary embodiment. Then, the user who sees the display inputs a password.

The components of a communication network, a wireless access point 101, and a wireless terminal 102 according to the fourth exemplary embodiment are the same as or similar to those according to the first exemplary embodiment, and the description of these components is omitted.

The process in a case where the setting start button 308 in the wireless terminal 102 according to the fourth exemplary embodiment is pressed will now be described.

Figure 15:
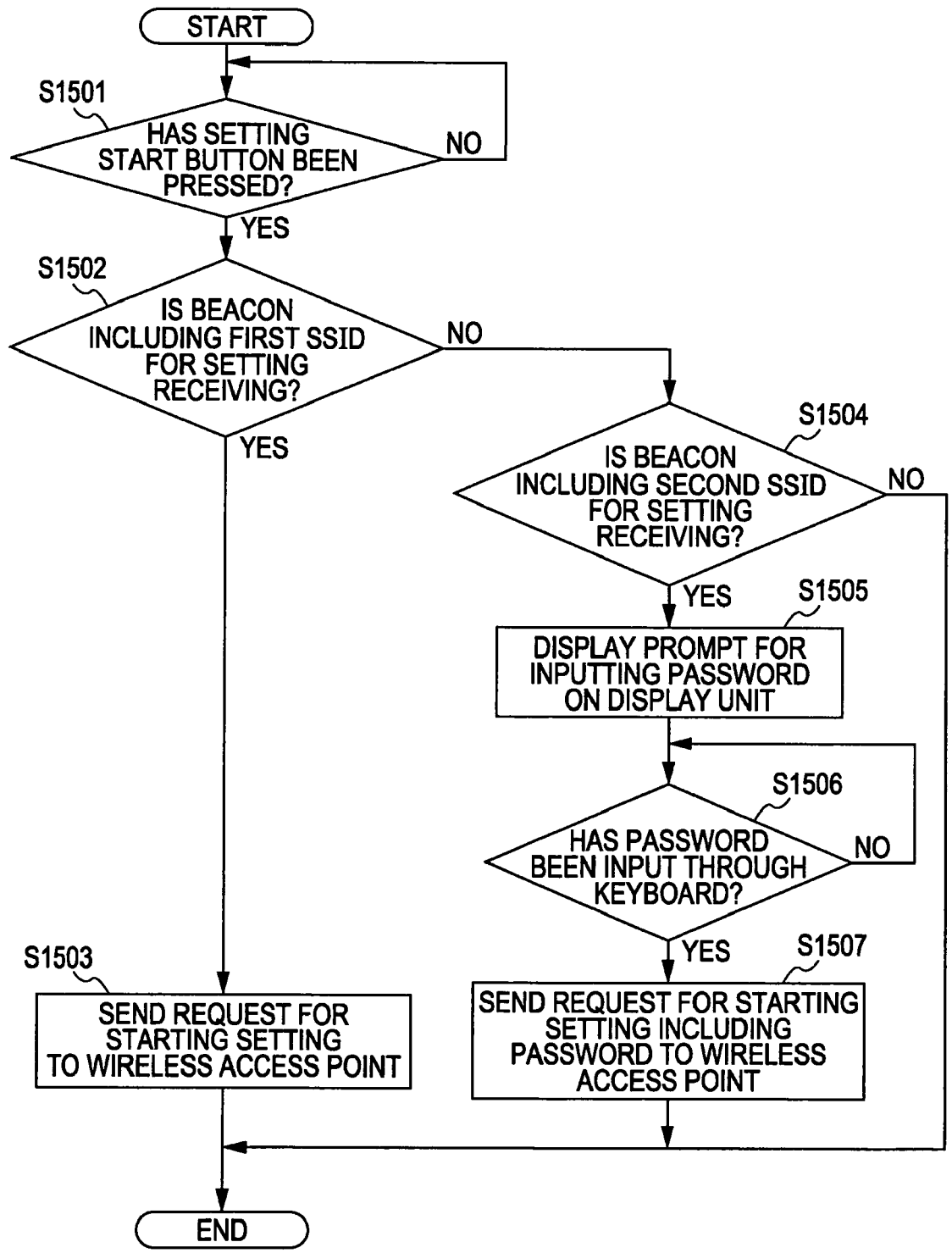
FIG. 15 is a flowchart showing the process of starting to set communication parameters in a wireless terminal according to a fourth exemplary embodiment.

FIG. 15 is a flowchart showing the process of starting to set communication parameters in the wireless terminal 102 according to the fourth exemplary embodiment. The wireless access point 101 first sends the beacon M601 that includes a first SSID for setting to the wireless terminal 102, as in the third exemplary embodiment, when the setting monitoring timer T1 has not been timed out. Alternatively, the wireless access point 101 sends the beacon M1401 that includes a second SSID for setting to the wireless terminal 102 when the setting monitoring timer T1 has been timed out.

On the other hand, the wireless terminal 102 monitors the status of the setting start button 308 in step S1501, determines in step S1502 whether the wireless terminal 102 is receiving the beacon M601 that includes the first SSID for setting, and determines in step S1504 whether the wireless terminal 102 is receiving the beacon M1401 that includes the second SSID for setting. In a case where the setting start button 308 has been pressed, when the wireless terminal 102 determines in step S1502 that the wireless terminal 102 is receiving the beacon M601 that includes the first SSID for setting, the process proceeds to step S1503. In step S1503, the wireless terminal 102 sends the request M1101 for starting setting that does not include a password to the wireless access point 101. In this case, the user does not input a password.

Alternatively, in the case where the setting start button 308 has been pressed, when the wireless terminal 102 determines in step S1504 that the wireless terminal 102 is receiving the beacon M1401 that includes the second SSID for setting, the process proceeds to step S1505. In step S1505, a prompt for inputting a password, for example, "Password?", is displayed on the display unit 309. Then, in step S1506, the wireless terminal 102 monitors the input of a password through the keyboard 310. When a password has been input, the process proceeds to step S1507 where the wireless terminal 102 sends the request M1201 for starting setting that includes the input password to the wireless access point 101. After step S1503 or S1507, the wireless terminal 102 completes the process shown in FIG. 15.

In the fourth exemplary embodiment, when the user of the wireless terminal 102 sets communication parameters, the user can readily determine whether a password needs to be input at the time of setting communication parameters. Thus, the user does not need to care about the timing of setting communication parameters and needs to input a password only when the prompt for inputting a password is displayed on the display unit 309 in the wireless terminal 102.

Fifth Exemplary Embodiment

A fifth exemplary embodiment according to the present invention will now be described in detail with reference to the drawings. According to the fifth exemplary embodiment, the level of the transmission power is changed when the setting monitoring timer T1 has been timed out in the first to fourth exemplary embodiments.

In the first to fourth exemplary embodiments, before the setting monitoring timer T1 is timed out, the first method for starting to set communication parameters can be performed. In the first method, it is assumed that the wireless access point 101 is close to the wireless terminal 102. Thus, the level of the transmission power can be reduced to a level that is low compared with that in a normal communication without any problems. Moreover, before the setting monitoring timer T1 is timed out, the password is not checked. Thus, the communication parameter setting sequence should be performed with low transmission power in view of the security.

The structures of a communication network, a wireless access point 101, and a wireless terminal 102 according to the fifth exemplary embodiment are the same as those according to the first exemplary embodiment, and the description of these structures is omitted.

The process of changing the level of the transmission power at the time of sending a beacon that includes an SSID for setting in the wireless access point 101 according to the fifth exemplary embodiment after the setting monitoring timer has been timed out will now be described.

Figure 16:
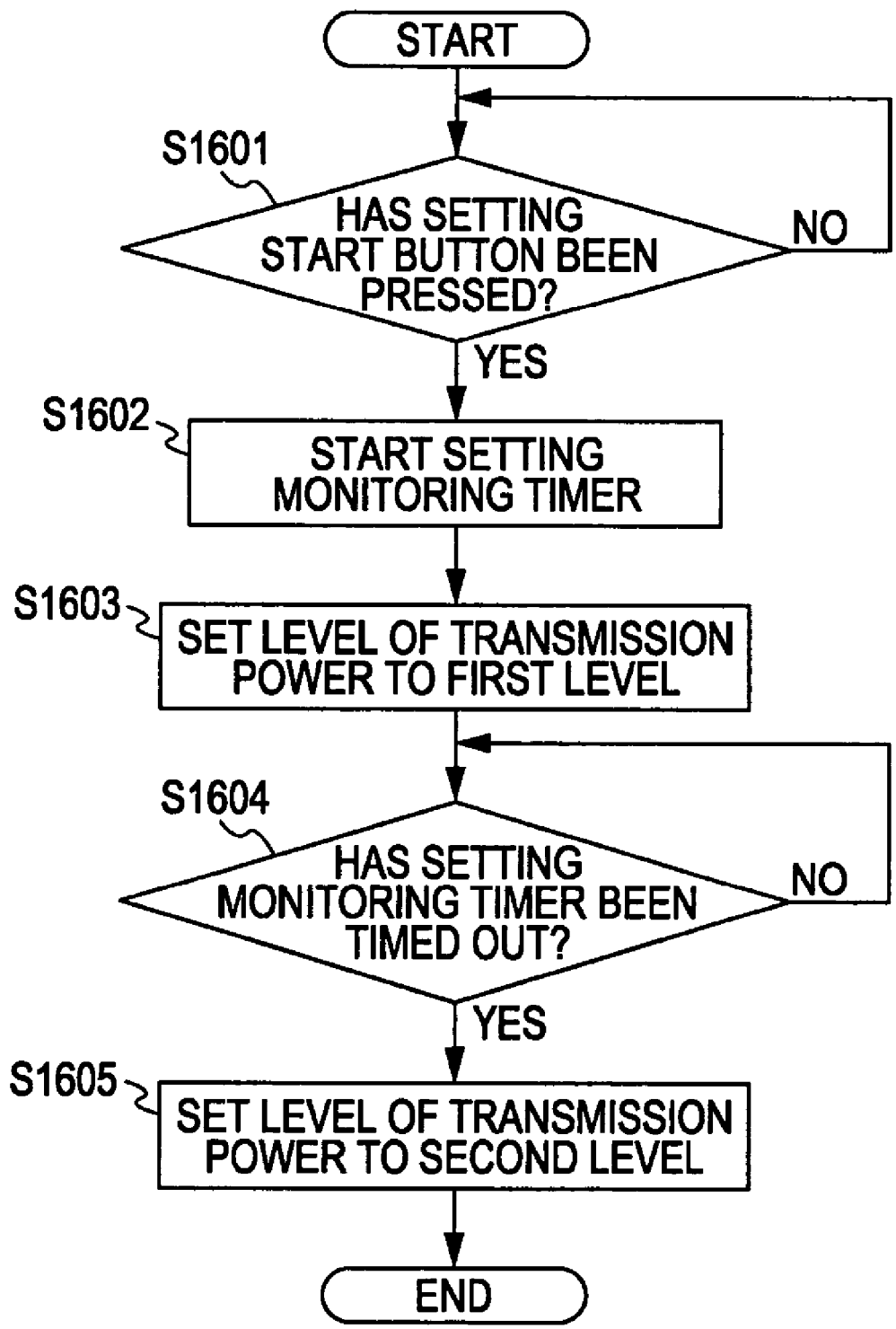
FIG. 16 is a flowchart showing the control process of transmission power in a wireless access point control unit in a wireless access point according to a fifth exemplary embodiment.

FIG. 16 is a flowchart showing the control process of the transmission power in the wireless access point control unit 201 in the wireless access point 101. The user of the wireless access point 101 first presses the setting start button 208 to start to set communication parameters, as in the first to fourth exemplary embodiments. At this time, in step S1601, the wireless access point control unit 201 in the wireless access point 101 monitors the status of the setting start button 208. When the wireless access point control unit 201 detects that the setting start button 208 has been pressed, the process proceeds to step S1602 where the wireless access point control unit 201 sets the setting monitoring timer T1 to start timing. Then, in step S1603, the wireless access point control unit 201 sets the level of the transmission power to a first level. Then, in step S1604, the wireless access point control unit 201 waits to detect that the setting monitoring timer T1 has been timed out. When the wireless access point control unit 201 detects that the setting monitoring timer T1 has been timed out, the wireless access point control unit 201 sets the level of the transmission power to a second level. In this exemplary embodiment, the first level is lower than the second level. Then, the process shown in FIG. 16 is completed. The other processes in the fifth exemplary embodiment are similar to those in the aforementioned exemplary embodiments, and the description of these processes is omitted.

Figure 19:
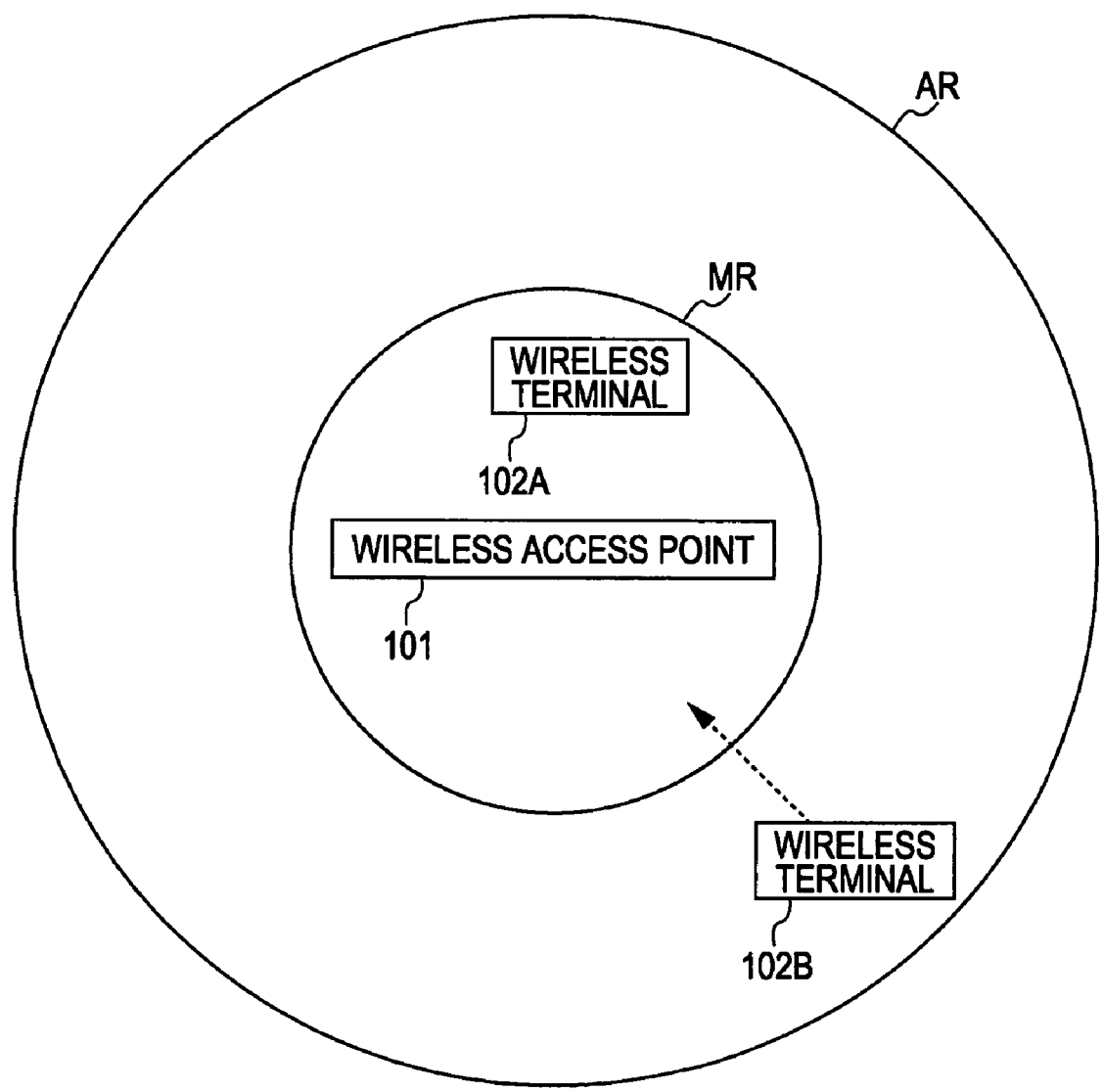
FIG. 19 shows a range within which communication parameters can be set for devices.

When the setting monitoring timer T1 has not been timed out, the wireless communication area of the wireless access point 101 can be narrowed down to a first wireless communication area for setting, for example, the wireless communication area MR shown in FIG. 19, by the aforementioned control process of the transmission power. Alternatively, when the setting monitoring timer T1 has been timed out, the wireless communication area of the wireless access point 101 is change to a second wireless communication area for setting, for example, the wireless communication area AR shown in FIG. 19. Thus, the wireless terminal 102A shown in FIG. 19 can perform the first or second method for starting to set communication parameters, and the wireless terminal 102B can perform only the second method for starting to set communication parameters.

In the fifth exemplary embodiment, when the first method for starting to set communication parameters is performed, communication parameters can be set in a way that is safe in view of possible interception of communication parameters and difficulty in determining a device that needs to be set up.

Sixth Exemplary Embodiment

Figure 17:
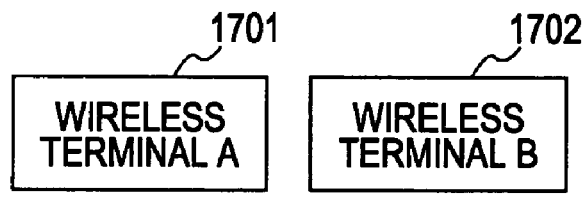
FIG. 17 shows a network in the ad hoc mode according to a sixth exemplary embodiment.
Figure 18:
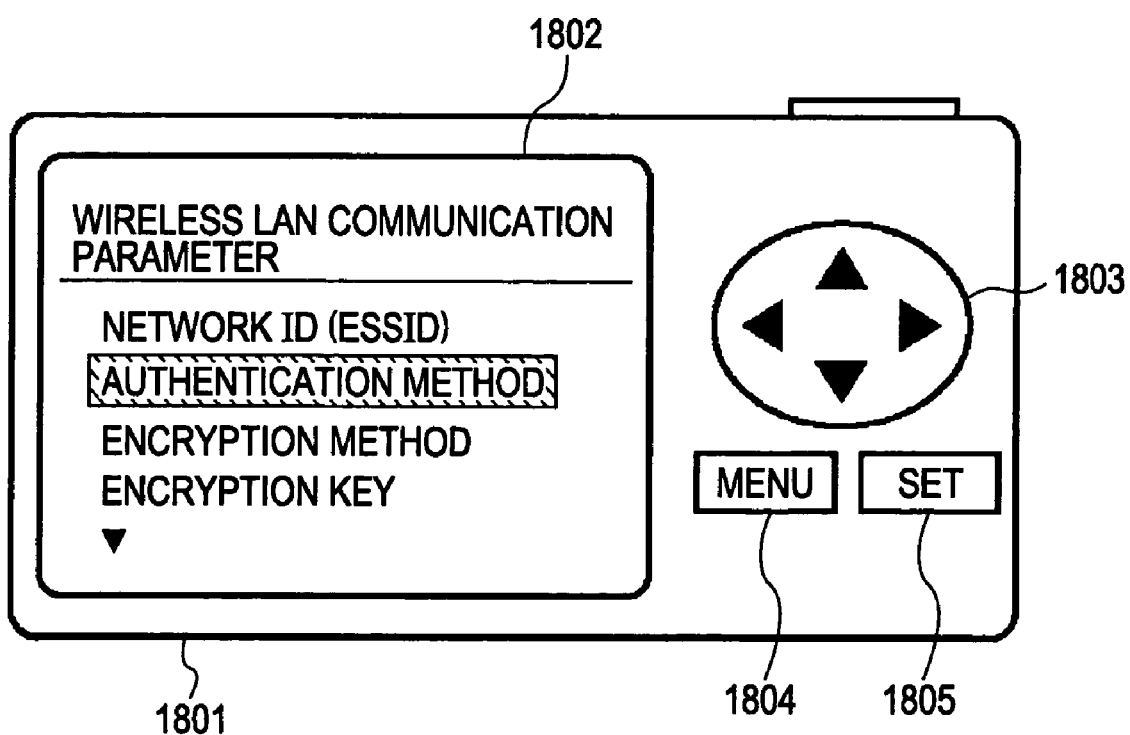
FIG. 18 shows an exemplary user interface of a digital camera for setting communication parameters.

A sixth exemplary embodiment according to the present invention will now be described in detail with reference to the drawings. In the first to fifth exemplary embodiments, setting of communication parameters between the wireless access point 101 and the wireless terminal 102 is performed through the wireless LAN in the infrastructure mode based on the IEEE 802.11. Alternatively, the present invention may be applied to a case where setting of communication parameters between a wireless terminal (A) 1701 and a wireless terminal (B) 1702 is performed in the ad hoc mode without the wireless access point 101, as shown in FIG. 17.

In this case, a network in the ad hoc mode is formed to set communication parameters. In the network, a master device that sends a beacon functions as the aforementioned wireless access point, and a slave device that participates in the network functions as the aforementioned wireless terminal.

Moreover, in this case, a general method for determining whether a certain wireless terminal is a master device or a slave device can be used.

In the present invention, setting of communication parameters can be flexibly performed in response to the environment in which communication devices are installed, as described above. Thus, the usability can be improved.

The present invention may be applied to a system that includes a plurality of devices (for example, a host computer, an interface device, a reader, and a printer) or an apparatus that includes a single device (for example, a copy machine or a facsimile machine).

The present invention is also achieved by an embodiment in which a recording medium that stores program codes of software that performs the functions according to the aforementioned exemplary embodiments is provided to a system or an apparatus and a computer (a central processing unit (CPU) or a micro processing unit (MPU)) included in the system or the apparatus reads and executes the program codes stored in the recording medium.

In this case, the program codes read from the recording medium perform the functions according to the aforementioned exemplary embodiments, and thus the present invention includes the recording medium, which stores the program codes.

The following media can be used as recording media that are used to supply the program codes: for example, a floppy disk, a hard disk, an optical disk, a magneto-optical disk, a compact disk read only memory (CD-ROM), a compact disk recordable (CD-R), a magnetic tape, a nonvolatile memory card, and a ROM.

Moreover, an operating system (OS) operating on a computer may execute some or all of the actual processing to perform the functions of the aforementioned exemplary embodiments according to instructions from the program codes.

Moreover, the program codes read from the recording medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the aforementioned exemplary embodiments according to instructions from the program codes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-172967 filed Jun. 13, 2005, which is hereby incorporated by reference herein in its entirety.

What is claimed is:

1. A method for performing a wireless communication parameters setting sequence for setting wireless communication parameters for wireless communication by a first communication device, the method comprising:
   detecting, at the first communication device, a user operation performed by a user of the first communication device for starting the wireless communication parameters setting sequence;
   receiving, at the first communication device, a request for setting the wireless communication parameters from a second communication device;
   performing the wireless communication parameters setting sequence with the second communication device according to the received request such that,
   in a case where the first communication device receives the request from the second communication device within a predetermined period as measured from the detection of the user operation at the first communication device, performing the wireless communication parameters setting sequence with the second communication device without an authentication process, wherein the authentication process is configured to use authentication information input into the second communication device by a user to determine whether the first communication device will permit the performing of the wireless communication parameters setting sequence with the second communication device, and,
   in a case where the first communication device receives the request from the second communication device after an expiration of the predetermined period, performing the authentication process in the first communication device and performing the wireless communication parameters setting sequence with the second communication device after the authentication process authenticates the user of the second communication device.

2. The method according to claim 1, in the case where the first communication device receives the request from the second communication device after an expiration of the predetermined period, the method further comprising: transmitting a send request to the second communication device to send the authentication information to the first communication device, wherein performing the authentication process includes performing the authentication process based on the authentication information received from the second communication device.

3. The method according to claim 1, wherein performing the authentication process includes performing the authentication process based on authentication information that is included in the request for setting the wireless communication parameters received at the first communication device from the second communication device.

4. The method according to claim 1, further comprising:
sending, from the first communication device to the second communication device within the predetermined period, a first notification that a current setting mode is a first setting mode, wherein the first setting mode is for performing the wireless communication parameters setting sequence without the authentication process; and
sending, from the first communication device to the second communication device after the expiration of the predetermined period, a second notification that the current setting mode is a second setting mode, wherein the second setting mode is for performing the authentication process.

5. The method according to claim 4, wherein the first setting mode is notified by sending a beacon that includes a first identification (ID), and the second setting mode is notified by sending a beacon that includes a second ID.

6. The method according to claim 4, wherein a transmission from the first communication device is configured to cause the second communication device to present a first display to instruct the second communication device user to set wireless communication parameters upon receiving the first notification and to present a second display to instruct the second communication device user to input authentication information upon receiving the second notification.

7. The method according to claim 4,
wherein a transmission from the first communication device is configured to cause the second communication device to present a display to instruct the second communication device user to input authentication information upon receiving the second notification, and
wherein the wireless communication parameters include at least one of a service set identifier, an authentication method, a user identification and corresponding password, an encryption method, an encryption key, and an operation mode.

8. The method according to claim 1, further comprising:
performing communication using a first level of transmission power in the case where the first communication device receives the request from the second communication device within a predetermined period from the detection of the user operation at the first communication device; and
performing communication using a second level of transmission power in the case where the first communication device receives the request from the second communication device after an expiration of the predetermined period.

9. A communication device to perform a wireless communication parameters setting sequence for setting wireless communication parameters that are used to wirelessly communicate with another communication device, the communication device comprising:
a detector configured to detect a user operation performed by a user of the communication device for starting the wireless communication parameters setting sequence;
a receiving unit configured to receive a request for setting the wireless communication parameters from the another communication device;
a timer configured to, in response to a detection of the user operation, measure a predetermined period from the detection of the user operation at the communication device; and
a communication-parameter setting unit configured to perform the wireless communication parameters setting sequence with the another communication device according to the received request, such that,
in a case where the communication device receives the request from the another communication device within the predetermined period, the communication-parameter setting unit performs the wireless communication parameters setting sequence with the another communication device without an authentication process, wherein the authentication process is configured to use authentication information input into the another communication device by a user to determine whether the communication device will permit the performing of the wireless communication parameters setting sequence with the another communication device, and,
in a case where the communication device receives the request from the another communication device after an expiration of the predetermined period, the communication-parameter setting unit performs the authentication process in the communication device and performs the wireless communication parameters setting sequence with the another communication device after the authentication process authenticates the user of the another communication device.

10. The communication device according to claim 9, wherein, in the case where the communication device receives the request from the another communication device within the predetermined period, the communication-parameter setting unit is configured to perform the wireless communication parameters setting sequence without requiring the authentication information of the another communication device.

11. The communication device according to claim 9, wherein, in the case where the communication device receives the request from the another communication device after an expiration of the predetermined period, the communication device further is configured to transmit a request to the another communication device to send the authentication information to the communication device and to perform the authentication process based on the authentication information received from the another communication device.

12. A method for controlling a communication device that performs a wireless communication parameters setting sequence for setting wireless communication parameters in a plurality of another communication devices, wherein the wireless communication parameters are used for communication, the method comprising:
detecting a user operation performed by a user for starting the wireless communication parameters setting sequence;
measuring, in response to a detection of the user operation, a predetermined period as measured from the detection of the user operation; and
performing the wireless communication parameters setting sequence with an another communication device from the plurality of another communication devices according to the received request, such that,
in a case where the communication device received the request from the another communication device within the predetermined period, the communication device performs the wireless communication parameters setting sequence with the another communication device without an authentication process, wherein the authentication process is configured to use authentication information input into the another communication device by a user to determine whether the communication device will permit the performing of the wireless communication parameters setting sequence with the another communication device, and, in a case where the communication device receives the request from the another communication device after an expiration of the predetermined period, the communication device performs the authentication process in the communication device and performs the wireless communication parameters setting sequence with the another communication device after the authentication process authenticates the user of the another communication device.

13. The method according to claim 12, further comprising:
in response to detecting the user operation, transmitting to the another communication device information indicating that setting of wireless communication parameters has been started.

14. The method according to claim 12, wherein, in a case where the communication device received the request from the another communication device within the predetermined period, performing includes performing the wireless communication parameters setting sequence without requiring the authentication information of the another communication device.

15. The method according to claim 12, wherein, in a case where the communication device receives the request from the another communication device after an expiration of the predetermined period, the method further comprises: transmitting a send request to the another communication device to send the authentication information to the communication device, wherein performing the authentication process includes performing the authentication process based on the authentication information received from the another communication device.

16. A non-transitory machine-readable medium having stored thereon instructions which, when executed by a first communication device, causes the first communication device to perform a method for performing a wireless communication parameters setting sequence for setting wireless communication parameters for wireless communication by the first communication device, the method comprising:
detecting, at the first communication device, a user operation performed by a user of the first communication device for starting the wireless communication parameters setting sequence;
receiving, at the first communication device, a request for setting the wireless communication parameters from a second communication device;
performing the wireless communication parameters setting sequence with the second communication device according to the received request, such that,
in a case where the first communication device receives the request from the second communication device within a predetermined period as measured from the detection of the user operation at the first communication device, performing the wireless communication parameters setting sequence with the second communication device without an authentication process, wherein the authentication process is configured to use authentication information input into the second communication device by a user to determine whether the first communication device will permit the performing of the wireless communication parameters setting sequence with the second communication device, and,
in a case where the first communication device receives the request from the second communication device after an expiration of the predetermined period, performing the authentication process in the first communication device and performing the wireless communication parameters setting sequence with the second communication device after the authentication process authenticates the user of the second communication device.

17. The non-transitory machine-readable medium according to claim 16, the method further comprising: transmitting a send request to the second communication device to send the authentication information to the first communication device, wherein performing the authentication process includes performing the authentication process based on the authentication information received from the second communication device.

18. The non-transitory machine-readable medium according to claim 16, the method further comprising: in response to detecting the user operation, transmitting to the second communication device information indicating that setting of wireless communication parameters has been started.

19. The non-transitory machine-readable medium according to claim 16, wherein, in the case where the first communication device receives the request from the second communication device within the predetermined period, performing includes performing the wireless communication parameters setting sequence without requiring the authentication information of the second communication device.

20. The non-transitory machine-readable medium according to claim 16, in the case where the first communication device receives the request from the second communication device after an expiration of the predetermined period, the method further comprising: transmitting a send request to the second communication device to send the authentication information to the first communication device, wherein performing the authentication process includes performing the authentication process based on the authentication information received from the second communication device.

21. A wireless access point that performs a wireless communication parameters setting sequence for setting wireless communication parameters that are used to wirelessly communicate with a wireless terminal, the wireless access point comprising:
a detector configured to detect a signal from a user-pressed setting start button to start to set the communication parameters;
a timer configured to, in response to a detection of the signal from the setting start button, measure a predetermined period from the detection of the signal from the setting start button;
a transmitting unit configured to transmit a first beacon that includes a service set identifier wireless communication parameter to the wireless terminal;
a determination unit configure to determine whether the timer has timed out; and
a receiving unit configured to, in a case where the determination unit determines that the timer has timed out, receive a signal indicating that a user has pressed a setting start button of the wireless terminal and a password from the wireless terminal in response to the transmitting unit sending, in a case where the determination unit determines that the timer has timed out, sending a second beacon that includes a service set identifier wireless communication parameter for setting the wireless terminal to the wireless terminal.

* * * * *